Figure 1:
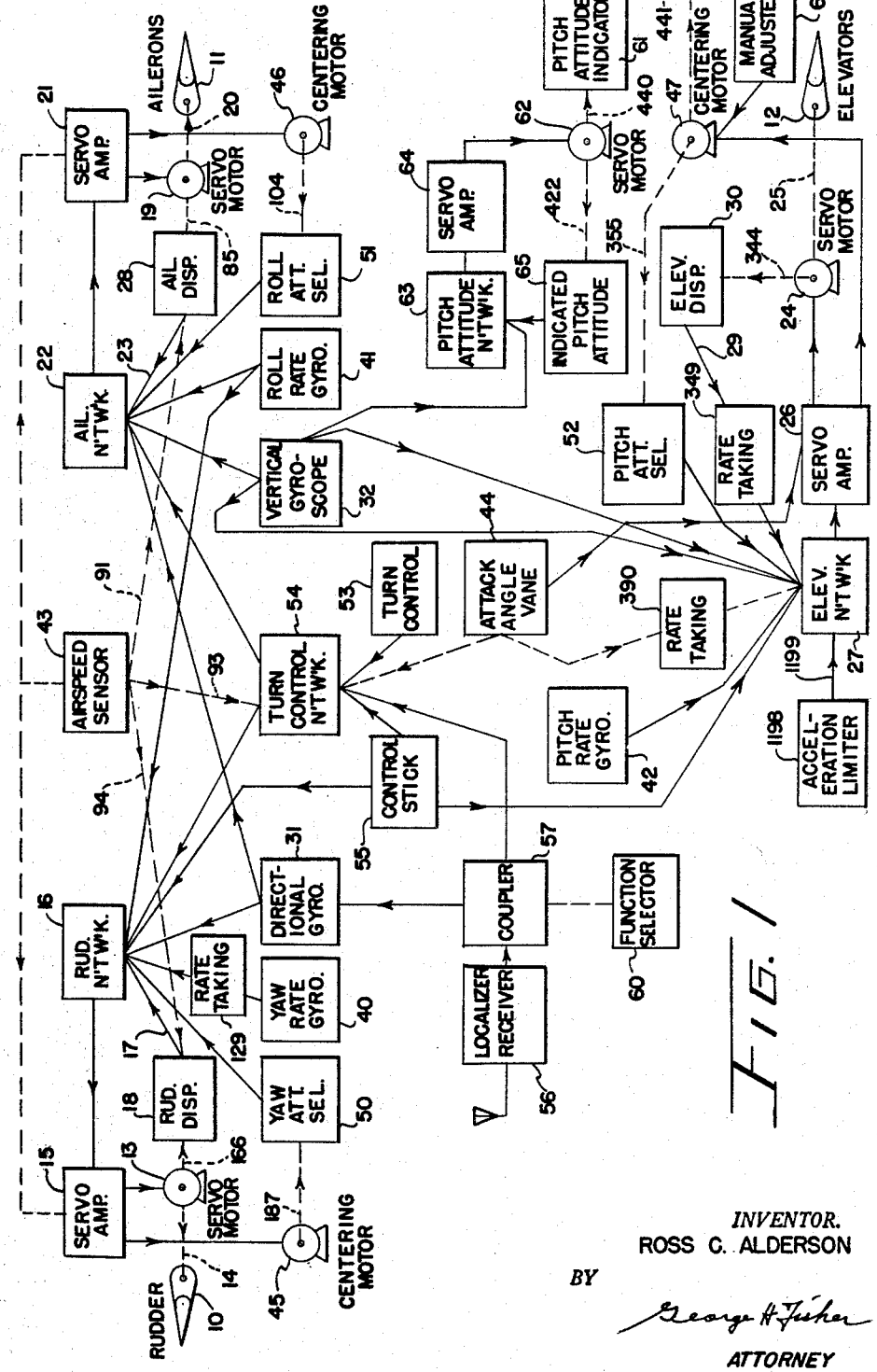

INVENTOR.
ROSS C. ALDERSON
BY
George H Fisher
ATTORNEY

INVENTOR.
ROSS C. ALDERSON
BY
*George H Fisher*
ATTORNEY

Jan. 8, 1963 R. C. ALDERSON 3,072,369
ADJUSTABLE APPARATUS FOR ATTITUDE STABILIZATION OF AIRCRAFT
Filed Jan. 18, 1951 6 Sheets-Sheet 4
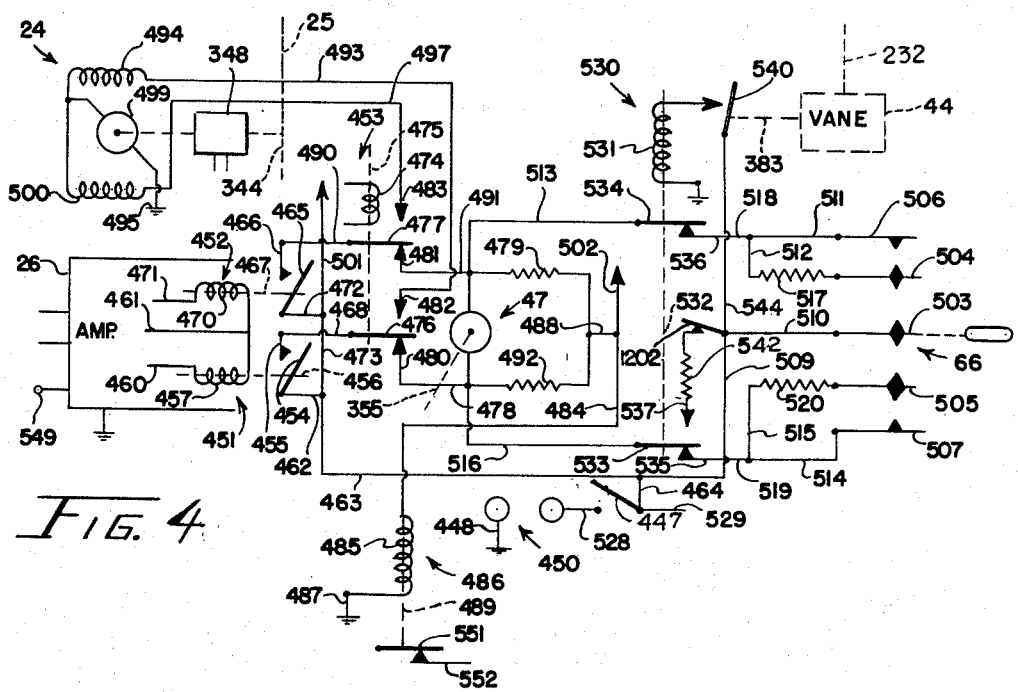
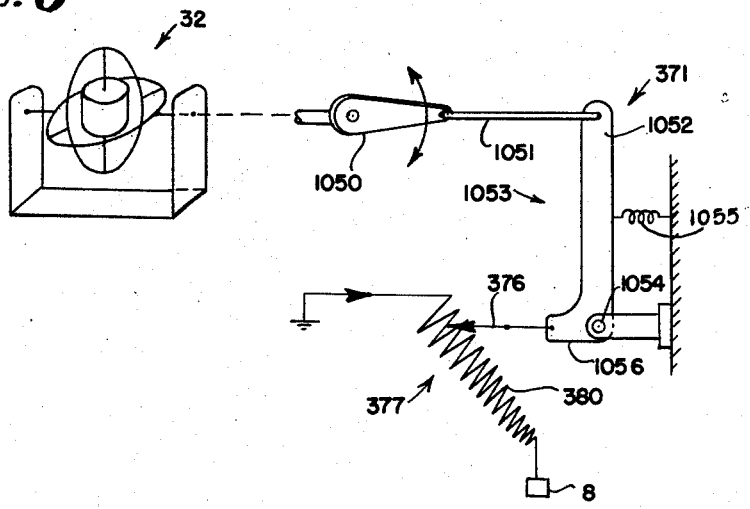
INVENTOR.
ROSS C. ALDERSON
BY
George H. Fisher
ATTORNEY

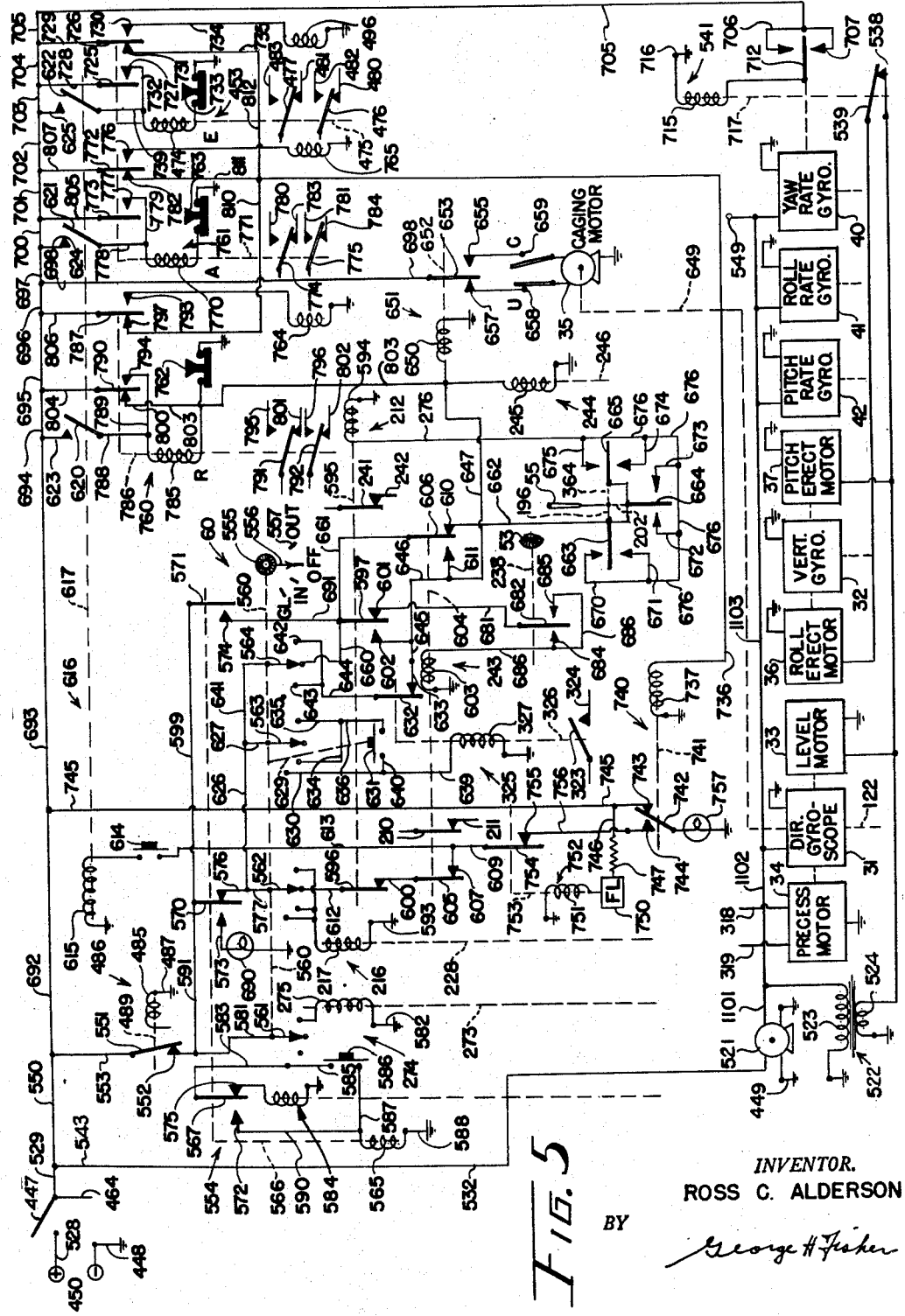

INVENTOR.
ROSS C. ALDERSON
BY
George H. Fisher

United States Patent Office 3,072,369
Patented Jan. 8, 1963

3,072,369
ADJUSTABLE APPARATUS FOR ATTITUDE STABILIZATION OF AIRCRAFT
Ross C. Alderson, Minneapolis, Minn., assignor to Minneapolis-Honeywell Regulator Company, Minneapolis, Minn., a corporation of Delaware
Filed Jan. 18, 1951, Ser. No. 206,579
31 Claims. (Cl. 244—77)

This invention relates to the field of aviation and more particularly to automatic pilots for controlling the attitude of a craft about its roll, pitch, and yaw axes. It includes improvements in the apparatus for stabilizing the craft in a desired attitude and in the adjusting means for selecting the attitude to be stabilized, together with means making the operation of the automatic pilot essentially constant over wide ranges of airspeed.

It is an object of the invention to provide an automatic pilot including means stabilizing a craft in a selected attitude and means for varying the selected attitude.

It is an object of the invention to provide an automatic pilot including means stabilizing the craft on a selected heading and mutually disabling means operable to vary the selected heading.

An object of the invention is to provide such an automatic pilot in which the response of the attitude control means to departure of the craft's attitude from that selected is modified in accordance with the air speed of the craft.

Another object of the invention is to provide such an automatic pilot having rudder and aileron control channels actuated by the heading varying means, in which the air speed responsive means directly modifies only one of the channels.

Another object of the invention is to provide an automatic pilot, having rudder and aileron control channels, in which the channels are energized in a first ratio in accordance with a signal from a source adjusted by a directional gyroscope, and in a second ratio in accordance with a signal, varying through either of two ranges, from a source adjusted by a radio responsive device, the arrangement being such that when one of the two ranges of the second source is selected the directional gyroscope is made inoperative, and that when the other range of the second source is selected the directional gyroscope is made operative, and a further signal from the second source is supplied to one of the control channels.

Another object of the invention is to provide an automatic pilot including an indicator lamp and means causing different illumination of the lamp for different conditions of the automatic pilot, so that the human pilot will not place the automatic pilot in control of the craft unintentionally when any of a plurality of attitude selectors are not in neutral condition.

A further object of the invention is to provide such an automatic pilot having attitude selecting means the satisfactory operation of which is insured by the use of electrical circuits energized with direct current, so that time functions of signals related to selected attitudes may be easily obtained in resistance-capacitance arrangements, and in which parallel rather than series summing is used in control circuits for the same purpose.

A further object of the invention is to provide such an automatic pilot in which such a time function, namely the rate of change, of a yaw rate gyro signal is used in the heading control apparatus to provide a co-ordinating signal which is zero when the rate of turn of the craft is constant.

A further object of the invention is to provide such an automatic pilot in which at least one channel includes a resistance-capacitance network arranged to differentiate a rebalancing voltage so as to give the channel as a whole reset properties when actuated by the attitude selecting means.

Yet another object of the invention is to provide such an automatic pilot in which a resistance-capacitance arrangement is used to modify the attitude control exerted to prevent stall of the craft.

A still further object of the invention is to provide an automatic pilot including means stabilizing the craft in a selected pitch attitude, and improved manually operable means operative upon pitch attitude selecting device to change the pitch attitude of the craft.

A still further object of the invention is to provide an automatic pilot including altitude control apparatus and a manual control stick, in which the altitude control apparatus is automatically disabled as long as the control stick is operated.

Yet another object of the invention is to provide an automatic pilot, including radio responsive apparatus for causing the craft to follow a glide path and altitude control apparatus, in which the altitude control apparatus is permanently disabled upon initiation of glide control from the radio equipment.

A more general object of the invention is to provide control apparatus having a reset component arranged to normally center itself when the apparatus is deenergized, together with means for disabling the apparatus while preventing recentering of the reset component.

Yet another object of the invention is to provide, in an automatic pilot, means controlling the elevators of a craft in accordance with its linear vertical acceleration so as to prevent the craft from being controlled in such a fashion as to subject it to excessive strains due to acceleration.

Various other objects, advantages, and features of novelty which characterize my invention are pointed out with particularly in the claims annexed hereto and forming a part hereof. However, for a better understanding of the invention, its advantages, and objects attained by its use, reference should be had to the subjoined drawing, which forms a further part hereof, and to the accompanying descriptive matter, in which I have illustrated and described a preferred embodiment of my invention.

Figure 2:
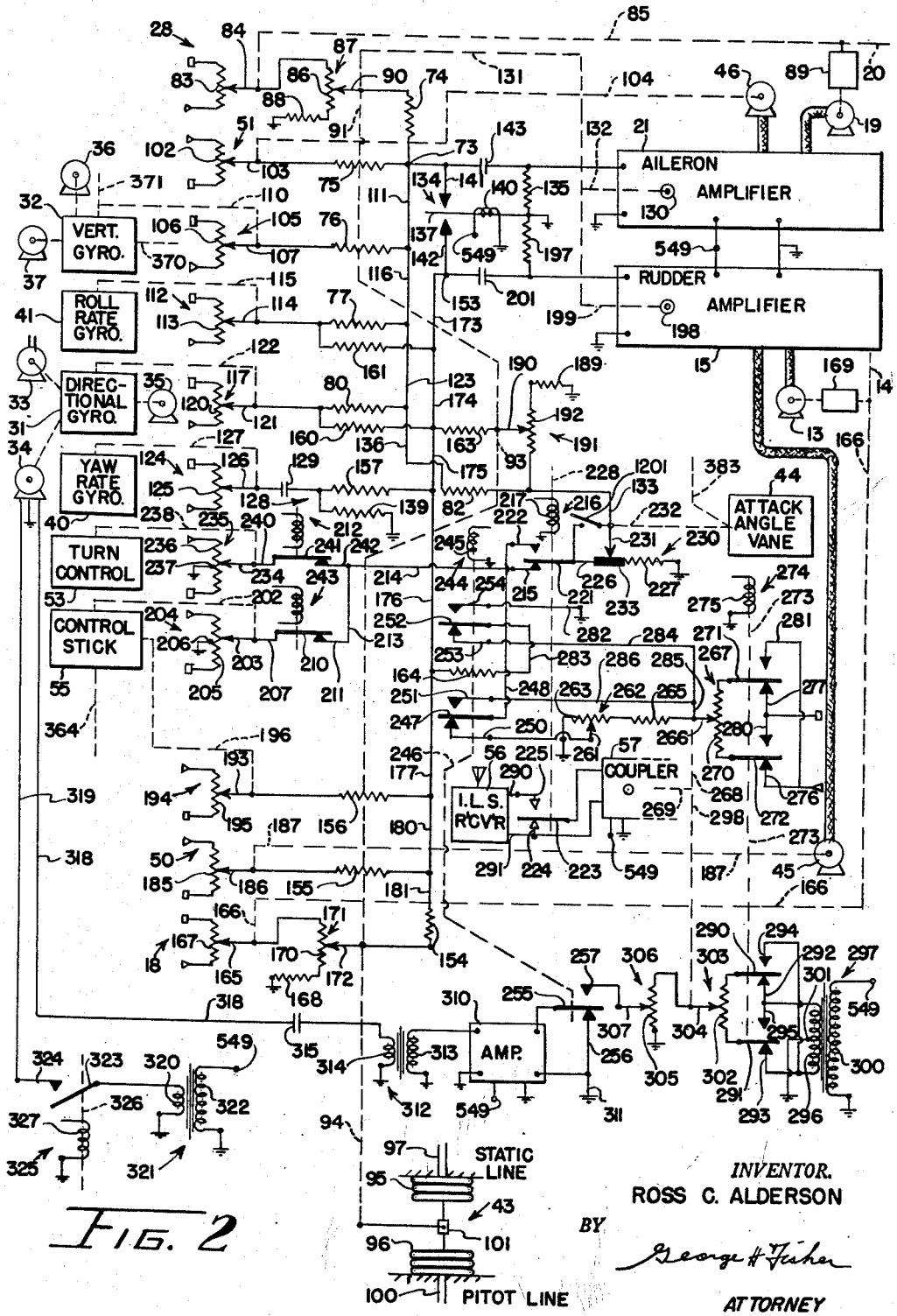
Figure 3:
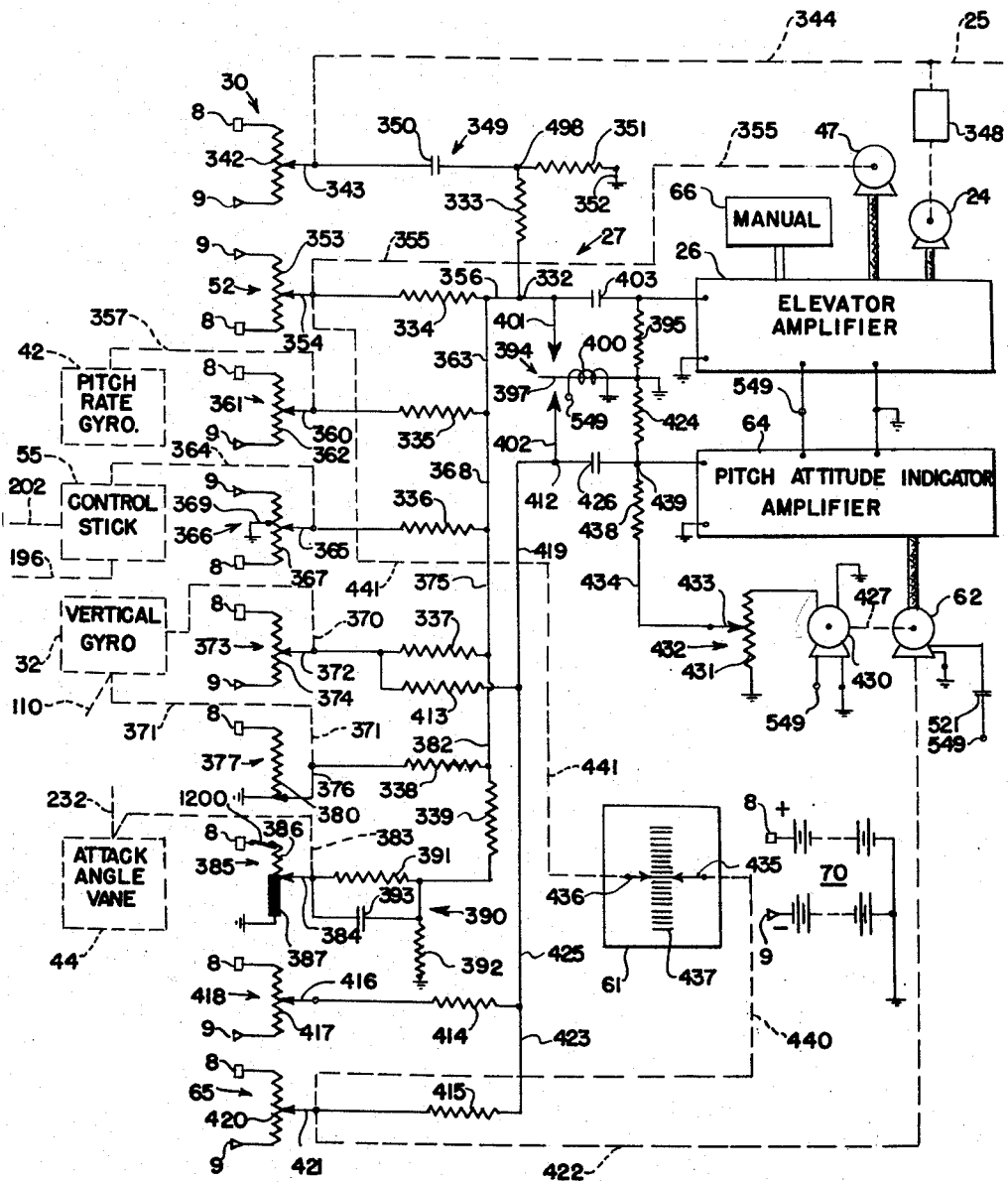
Figure 7:
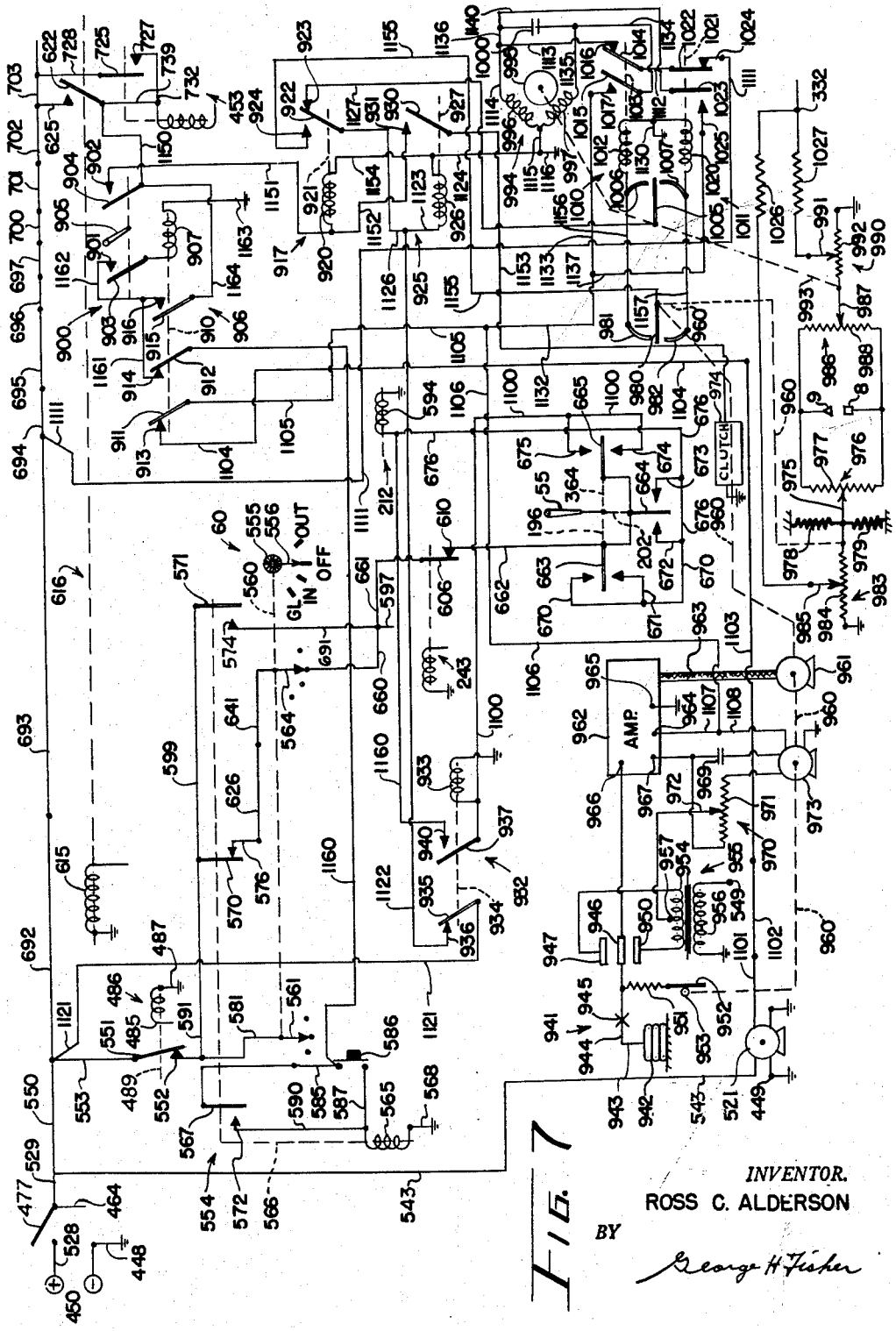

In the drawing:
FIGURE 1 is a schematic showing of the automatic pilot taken as a whole;
FIGURE 2 is a diagrammatic showing of the heading control portion of the automatic pilot;
FIGURE 3 is a diagrammatic showing of the pitch attitude control portion of the automatic pilot;
FIGURE 4 is a fragmentary showing of the motor control portion of the elevator channel of FIGURE 3;
FIGURE 5 is a detailed diagram showing the controlling interconnections linking the various components of the automatic pilot;
FIGURE 6 is a fragmetnary view of an up-elevator linkage for a vertical gyroscope; and
FIGURE 7 is an extension of FIGURE 5 showing means for stabilizing the altitude of the craft.

The general purpose of the invention is to operate the attitude control surfaces of an aircraft in a desired fashion. In FIGURE 1 the rudder of the aircraft is indicated by the reference numeral 10, the ailerons by numeral 11, and the elevators by numeral 12. Rudder 10 is operated through a mechanical connection 14 by a servomotor 13 in accordance with the output of an amplifier 15, the latter being controlled by a rudder network 16. As shown at 17, an input to rudder network 16 is provided, from a rudder displacement device 18, which varies in accordance with the position of the rudder to provide a feedback signal.

Ailerons 11 are shown as operated through a mechanical connection 20 by a servomotor 19 in accordance with the output from an amplifier 21, the latter being controlled by an aileron network 22. As shown at 23 an input to aileron network 22 is provided, from an aileron displacement device 28, which varies in accordance with the position of the ailerons.

Elevators 12 are shown as operated through a mechanical connection 25 by a servomotor 24 in accordance with the output of an amplifier 26, the latter being controlled by an elevator network 27. As shown at 29 an input to network 27 is provided, from an elevator displacement device 30, which varies in accordance with the position of the elevators.

Standards of attitude are supplied for the system by a directional gyroscope 31, effective in rudder network 16 and aileron network 22, and a vertical gyroscope 32, effective in aileron network 22 and elevator network 27. As best shown in FIGURE 5, directional gyroscope 31 includes a leveling motor 33, a precessing motor 34, and a caging motor 35, and vertical gyroscope 32 includes a roll erection motor 36 and a pitch erection motor 37. There are also provided a yaw rate gyroscope 40, effective in rudder network 16, a roll rate gyroscope 41, effective in both rudder network 16 and aileron network 22, and a pitch rate gyroscope 42, effective in elevator network 27, as will presently be described.

FIGURE 1 also shows that an attack angle responsive vane 44, which supplies an additional signal to elevator network 27 if the attack angle of the craft exceeds a selected value, is also provided.

Amplifier 15 energizes a centering motor 45 alternatively with servo motor 13: similarly a centering motor 46 is energized by amplifier 21 alternatively with servomotor 19, and a centering motor 47 is energized by amplifier 26 alternatively with servomotor 24. Centering motor 45 operates to provide a signal to rudder network 16 from a yaw attitude selector 50, whose function is to maintain the rudder network "balanced" whenever servomotor 13 is not operative. In a similar fashion aileron network 22 is maintained balanced, whenever servomotor 19 is not operative, by roll attitude selector 51 adjusted by centering motor 46, and elevator network 27 is maintained balanced, whenever servomotor 24 is not operative, by pitch attitude selector 52 adjusted by centering motor 47.

The elements heretofore described make up an automatic pilot which is capable of stabilizing a craft in a single attitude about three axes. It is desirable however to provide for adjustment of the attitude of the craft about the axes in accordance with the wishes of the human pilot, and to this end there are provided a number of further components. A turn control 53 is effective through a turn control network 54 to supply additional signals to rudder network 16 and aileron network 22. It has been found desirable to limit the amount of signal which can be provided by turn control network 54, to prevent the craft from assuming a stalling condition while turning. For this purpose attack angle vane 44 is shown as exercising supervisory authority over turn control network 54.

Turn control 53 is effective to cause "coordinated" turns of the craft, that is, turns in which apparent gravity has the direction of the floor of the craft. It is at times desirable to maintain manual control not only of the heading of the craft but also of its attitude in pitch and roll, and it is also sometimes desirable to cause uncoordinated turns of the craft, such as skidding or slipping turns. To make this possible, there is provided a control stick 55 which may be operated to supply a first signal to the turn control network to cause a coordinated turn, to supply a second signal directly to rudder network 16 to cause a skidding turn, and to supply a third input to elevator network 27 to raise or lower the nose of the craft.

The effect on the attitude of a craft of a particular amount of control surface displacement has been found to vary widely with airspeed: an automatic pilot adjusted for proper control of the craft at medium airspeeds may give sluggish control at low airspeeds and unstable control at high airspeeds. This may be overcome by modifying the operation of the automatic pilot in accordance with airspeed: the means and amount of modification required are fixed by the characteristics of the airframe and automatic pilot being used.

In the embodiment of the invention shown in FIGURE 1 the variables sensed in normal stabilizing operation of the automatic pilot are the roll, pitch, and yaw attitudes of the aircraft and their rates of change. A signal determined by each of these variables is supplied to one or more of the control channels of the automatic pilot, as previously described. Thus the roll rate and heading signals are supplied to both rudder and aileron control channels, the heading rate signal only to the rudder control channel, the roll attitude signal to the aileron and elevator control channels, and the pitch and pitch rate signals only to the elevator control channel.

As applied to a selected airframe and automatic pilot, it has been found that, except for the signals to the elevator channel, all the attitude responsive signals should be modified, to compensate for the effect of varying airspeed in accordance with $1/Q$, the reciprocal of the dynamic pressure: the same is true of the attitude selection signals.

It will readily be understood that, if all the variables affecting the operation of one channel of the automatic pilot are to be modified in the same manner, the identical result may be accomplished by modifying the control surface position sensor or rebalance signal in the inverse manner instead, thus greatly simplifying the physical structures involved. In general, when most of the variables affecting a control channel are to be modified in the same manner, but one or more are to be modified in a second manner, it is simpler to modify the rebalance signal inversely to the first manner, and then modify the smaller number of signals in accordance with the disparity between the first manner and the second manner to maintain proper ultimate proportion among the signals.

This latter principal is applicable to the signal from turn control network 54 to the rudder network, which has been found to be best modified, not in accordance with $1/Q$, but in accordance with $1/Q^{3/2}$. An airspeed sensor 43 is shown as modifying the rudder displacement signals according to $Q$, which has the same effect as modifying in accordance with $1/Q$ all the inputs to rudder network 16, including that from turn control network 54. To give the desired total modification in accordance with $1/Q^{3/2}$ a separate of the turn control signal to the rudder network in accordance with $1/Q^{1/2}$ is also necessary, and is provided as shown in the figure. The same principle may be applied in the more complex airspeed, modifications required in other craft control problems.

Since it has been found satisfactory not to modify the elevator signals in accordance with airspeed, no link between sensor 43 and member 30 or any of members 42, 52, and 32 has been shown. Such a link is however contemplated in embodiments of the invention where its function is necessary.

It is desirable to be able to make instrument landings with the craft automatically, in response to radio signals. Heading control of the craft is accomplished for this purpose by signals from a localizer receiver 56, which are modified in a coupler 57 to give them characteristics best suited for use in the automatic pilot. Under the control of a function selector 60 the output from the coupler may be supplied either to turn control 54, or both to turn control 54 and to precession motor 34 of directional gyroscope 31.

Vertical control of the craft in automatic landings is accomplished through control of power by means not forming a part of the present invention.

The automatic pilot described in this application comprises one of the major components of a more comprehensive aircraft control apparatus including not only attitude control but attack angle control as well. The apparatus as a whole is discussed in my copending application Serial No. 206,577, now U.S. Patent No. 2,853,254, and the attack angle control apparatus per se is discussed in my copending application Serial No. 206,578, now U. S. Patent No. 2,774,558 both filed concurrently with the present application and assigned to the same assignee.

In the operation of the overall apparatus referred to above, and generally in the operation of automatic pilots, it is desirable that control of the aircraft about its pitch axis be not only extremely accurate, but also extremely flexible. For this purpose the visual indications of the craft's gyro-horizon are not of sufficient sensitivity, and a more practical indicator of pitch attitude is desirable. Such an indicator comprises a portion of the automatic pilot described herein, and is shown in general at 61. An indication of actual pitch attitude is produced in indicator 61 by a servomotor 62 which is energized through a pitch attitude network 63 and an amplifier 64 from the pitch axis output of vertical gyroscope 32: motor 62 also adjusts an indicated pitch attitude device 65. At the same time an indication of desired or selected pitch attitude is supplied on indicator 61 by centering motor 47. A manual pitch attitude adjuster 66 is provided for causing operation of motor 47 independently of amplifier 26, to vary the selected pitch attitude at the will of the human pilot.

A source of direct current for the rudder, aileron, elevator and pitch attitude indicator control channels is shown at 70 in FIGURE 3 as a number of cells having a grounded central connection and positive and negative terminals indicated respectively by the reference numerals 8 and 9. Source 70 may in fact be any arrangement for supplying a carefully regulated unidirectional voltage having positive and negative terminals and a grounded central connection. In some cases it may be desirable to tap source 70 at intermediate points equidistant from the grounded central connection, so that sources of two or more different voltages are available.

*Aileron and Rudder Control Apparatus*

As shown in FIGURE 2, the aileron network of FIGURE 1 energizes amplifier 21, through a vibrator 134, from a summation terminal 73, to which are connected a plurality of summing resistors 74, 75, 76, 77, 80, and 82. The magnitudes of the summing resistors, and others to be identified, are chosen to give signals to summation terminal 73 of selected relative magnitudes.

Aileron displacement device 28 of FIGURE 1 is shown in FIGURE 2 to comprise a voltage divider having a winding 83 and a slider 84 actuated by servomotor 19 through a suitable mechanical connection 85, which includes a normally disengaged clutch 89 electrically energizable to mechanically connect servomotor 19 to the ailerons of the craft. Slider 84 is moved upwardly when motor 19 operates in a direction to cause left roll of the craft, and is centered when the ailerons are streamlined.

A voltage divider 87 is shown to include a fixed resistor 88, a winding 86, and a slider 90 actuated through mechanical connections 91, 93, and 94 by air speed responsive device 43. This device, as shown at the bottom of FIGURE 2, comprises a pair of pressure responsive bellows 95 and 96 subject internally to the pressure of the static and pitot lines 97 and 100, respectively, and acting in opposition through a mechanical linkage 101. Slider 90 is moved upwardly as the air speed increases, and is at the bottom of winding 86 for a selected minimum air speed less than that at which stalling takes place.

Roll attitude selector 51 of FIGURE 1 is shown in FIGURE 2 to comprise a voltage divider having a winding 102 and a slider 103 actuated through a mechanical connection 104 by centering motor 46. Slider 103 is moved upwardly by operation of motor 46 in response to the kind of signal which would energize motor 19 to cause left roll.

A voltage divider 105 is shown to have a winding 106 and a slider 107 arranged for actuation by vertical gyroscope 32 through a first mechanical connection 110. Winding 106 is fastened to the craft, and since slider 107 is stabilized by the vertical gyroscope, any roll of the craft results in movement of the winding with respect to the slider. Slider 107 apparently moves upwardly when the craft rolls to the left, and is centered when the craft is level about the roll axis.

A voltage divider 112 is shown to have a winding 113 and a slider 114 actuated through a mechanical connection 115 by roll rate gyroscope 41. Whenever the craft is rolling, slider 114 is displaced along winding 113 in proportion to the rate at which the roll is taking place. When the rate of roll to the left increases, slider 114 is displaced upwardly, and the slider is centered when the craft has no rate of roll in either direction.

A voltage divider 117 is shown to have a winding 120 and a slider 121 actuated through a mechanical connection 122 by directional gyroscope 31. Winding 120 is fastened to the craft, and accordingly whenever the heading of the craft changes the winding moves with respect to slider 121, which is stabilized by the directional gyroscope. Slider 121 apparently moves upwardly when the craft turns to the left, and is centered when the heading of the craft coincides with the setting of the gyroscope.

A voltage divider 124 is shown to have a winding 125 and a slider 126 actuated by yaw rate gyroscope 40 through a mechanical connection 127. Whenever the craft is yawing slider 126 is displaced along winding 125 in proportion to the rate at which the yaw is taking place. A rate taking network 128, including a capacitor 129 and a resistor 130, is associated with slider 126. Slider 126 moves upwardly when the rate of turn to the left increases, and is centered when the craft has no rate of turn in either direction.

Vibrator 134 comprises a movable contact 137 actuated by means of an energizing winding 140 to alternately engage a first fixed contact 141 and a second fixed contact 142. In the deenergized condition of winding 140, movable contact 137 does not engage either fixed contact. When an alternating voltage of a selected frequency is applied to winding 140, movable contact 137 oscillates at the same frequency, moving out of engagement with one fixed contact and into engagement with the other as the alternating voltage passes through zero.

Amplifier 21 is of the type which actuates one or the other of two servo relays according as an input voltage is in phase or 180° out of phase with an energizing voltage, the relay energized being held in continuously for large input voltages, and operated intermittently with an increasing off-to-on ratio as the input signal decreases. One amplifier suitable for this use is disclosed in Gille Patent 2,425,733. The amplifier includes a gain control 130 operated through mechanical connections 94, 93, 91, 131, and 132 from airspeed sensing device 43.

Associated with amplifier 21, as will be pointed out in connection with FIGURE 4, is an aileron engage relay which supplies the energizing voltage controlled by the servo relays either to servomotor 19 or to centering motor 46. Also associated with amplifier 21 are a blocking capacitor 143 and an input resistor 135.

Servomotor 19 is a series wound, reversible, direct current motor which operates in one direction or the other according as one or the other of two field windings is energized concurrently with the armature.

Centering motor 46 is a permanent magnet field, reversible, direct current motor which operates in one direction or the other according as the energizing voltage applied to its armature is of one polarity or the other.

As shown in FIGURE 2, the rudder network of FIGURE 1 energizes its amplifier, through vibrator 134, from a summation terminal 153, to which are connected a plurality of summing resistors 154, 155, 156, 157, 160, 161, 163, and 164.

Rudder displacement device 18 of FIGURE 1 is shown in FIGURE 2 to comprise a voltage divider having a winding 167 and a slider 165 actuated by servomotor 13 through a suitable mechanical connection 166, which includes a normally disengaged clutch 169 like clutch 89 already described. Slider 165 moves upwardly when motor 13 operates in a direction to cause left turn to the craft, and is centered when the rudder of the craft is streamlined.

A voltage divider 171 is shown to include a fixed resistor 168, a winding 170 and a slider 172 actuated through mechanical connection 94 by air speed responsive device 43. Slider 172 moves upwardly as the air speed increases, and is at the lower end of winding 170 for the selected minimum air speed.

Yaw attitude selector 50 of FIGURE 1 is shown in FIGURE 2 to comprise a voltage divider having a winding 185 and a slider 186 actuated through a mechanical connection 187 by centering motor 45. Slider 186 is moved upwardly by operation of motor 45 in response to the kind of signal which would energize motor 13 to cause left turn.

A voltage divider 194 is shown to have a winding 195 and a slider 193 actuated through mechanical connection 196 by control stick 55 when the latter is rotated about its own axis. Slider 193 moves upwardly when stick 55 is rotated to the left, and is centered when the control stick is in its central, inoperative position about its axis.

Amplifier 15 is of the same type as amplifier 21 previously discussed: associated therewith are a blocking condenser 201, an input resistor 197, and a rudder engage relay supplying energizing voltage from amplifier 15 either to servomotor 13, like servomotor 19, or to centering motor 45, like motor 46. The amplifier includes a gain control 198 operated through mechanical connections 94, 93, 91, 131, and 199 from airspeed sensing device 43.

Turn control network 54 of FIGURE 1 is shown in the center of FIGURE 2 to include a voltage divider 191 having a fixed resistor 189, a winding 192, and a slider 190 actuated through mechanical connections 93 and 94 by airspeed responsiove device 43. Slider 190 is moved upwardly as air speed increases, and is at the bottom of its winding for the selected minimum air speed.

A voltage divider 204 is shown to have a winding 205, center tapped at 206, and a slider 203 actuated, through a second mechanical connection 202, by control stick 55 when the latter is rotated about its roll axis. Slider 203 is moved upwardly when control stick 55 is moved so as to cause a turn to the left, and is centered when the control stick is in its central, inoperative position about its roll axis. This output from voltage divider 204 is cut off from the rest of the circuit upon disengagement between a movable contact 210 and a fixed contact 211 of a control stick relay 243 which will be described more completely in connection with FIGURE 5.

A localizer relay 216 is shown in FIGURE 2 to comprise a winding 217 which acts when energized to move an armature 228, displacing a plurality of movable contacts 221 and 223 out of normal engagement with a plurality of fixed contacts 215 and 224 and into engagement with a plurality of fixed contacts 222 and 225. The energizing circuit for relay 216 is shown in FIGURE 5.

A voltage divider 230 is shown in FIGURE 2 to have a slider 231 and a winding 227 which is metallized over a major portion of its effective length, as indicated at 233. Slider 231 is actuated through a mechanical connection 232 by attack angle responsive vane 44, and moves to the right for increasing values of attack angle.

For all values of attack angle less than 10°, slider 231 rests, under control of mechanical connection 232, on the metallized portion of winding 227. However, if the attack angle exceeds 10 degrees, slider 231 is displaced along winding 227 so that it rests upon the resistance portion rather than the metallized portion thereof, and by the time the attack angle reaches 15 degrees slider 231 is at the right hand end of its winding.

A voltage divider 235 is shown to have a winding 236 center tapped at 237, and a slider 234 actuated through a mechanical connection 238 by operation of turn control 53. Slider 234 is moved upward when the turn control is operated so as to cause a turn to the left, and is centered when the turn control is in its central, inoperative position. This output from voltage divider 235 is cut off from the rest of the circuit upon disengagement between a movable contact 241 and a fixed contact 242 of a turn control relay 212 which will be described more completely in connection with FIGURE 5.

The turn control network may also be influenced by the blind landing receiver 56 through coupler 57, and when this is done, operation of turn control 53 or control stick 55 is prevented from having any effect on the network by operation of localizer relay 216, which is energizable through a circuit shown in FIGURE 5.

An output relay 244 is shown in FIGURE 2 to comprise a winding 245 which acts when energized to move an armature 246, displacing a first movable contact 247 out of normal engagement with a fixed contact 250 and into engagement with a fixed contact 251, displacing a second movable contact 252 out of normal engagement with a fixed contact 253 and into engagement with a fixed contact 254, and displacing a third movable contact 255 out of normal engagement with a fixed contact 256 and into engagement with a fixed contact 257. The energizing circuit for output relay 244 is shown in FIGURE 5.

A ratio adjusting voltage divider 262 is shown to have a winding 263 and a manually adjustable slider 261. A fixed resistor 265 is associated with voltage divider 262, and with a further voltage divider 267 having a winding 270 and a slider 266 actuated through mechanical connections 268 and 269 by coupler 57.

A reversing relay 274 is shown to comprise a winding 275 which acts when energized to move an armature 273, displacing movable contacts 271, 272, 290, and 291 out of normal engagement with fixed contacts 277, 276, 292, and 293 and into engagement with fixed contacts 281, 280, 294, and 295, all respectively.

Coupler 57 operates through mechanical connections 269 and 268 to position slider 266 in accordance with the signal applied to the input of the coupler, and any device suitable for performing this function may be used. One exemplification of such an arrangement is to be found in the copending application of Alderson et al., Serial No. 49,442, filed September 15, 1948, and assigned to the assignee of the present invention, now Patent 2,993,664. When the craft is on the desired localizer path, or when the coupler is not being used to control the craft, slider 266 is at the center of winding 270, and the slider moves upward when a craft flying toward an ILS transmitter moves to the left of the desired path.

Associated with relay 274 are a transformer 297 having a primary winding 300 and a secondary winding 296 with a center tap 301, and a voltage divider 303 having a winding 302 and a slider 304 which is actuated by coupler 57, simultaneously with slider 266 of voltage divider 267, through mechanical connections 269 and 298. Slider 304 is moved upwardly when a craft flying toward an ILS transmitter is to the left of the desired path: it is centered when the craft is on the desired path, and when the coupler is not in control of the craft.

A voltage divider 306 is associated with voltage divider 303, and is shown to have a winding 305 and a manually adjustable slider 307.

An amplifier 310 is shown at the bottom of FIGURE 2, and is of the type which supplies an alternating voltage output which reverses in phase and varies in magnitude in conformity to alternating voltage applied to the input. Associated with amplifier 310 is a voltage reducing transformer 312 having a primary winding 313 and a secondary winding 314. A quadrature capacitor 315 is associated with secondary winding 314.

A second voltage reducing transformer 321 is shown to have a primary winding 322 and a secondary winding 320. The output of transformer 321 may be interrupted by disengagement between a movable contact 323 and a fixed contact 324 of a precession relay 325, which will be described more completely in connection with FIGURE 5.

Precession motor 34 is a split phase alternating current motor which operates when the voltages on its two windings are in phase quadrature, the direction of rotation depending on which of the two windings is energized with a leading phase.

As just discussed, FIGURE 2 discloses details of the aileron and rudder control networks comprised in the automatic pilot, and includes a complete disclosure of the turn control network. FIGURE 3, to which reference should now be made, is a similar disclosure of the elevator and pitch attitude indicator networks of the automatic pilot. As shown in FIGURE 3, the elevator network of FIGURE 1 energizes amplifier 26 from a summation terminal 332, to which are connected a plurality of summing resistors 333, 334, 335, 336, 337, 338, and 339.

Elevator displacement device 30 of FIGURE 1 is shown in FIGURE 3 to comprise a voltage divider having a winding 342 and a slider 343 actuated by servomotor 24 through a suitable mechanical connection 344, which includes a clutch 348 like clutch 89 of FIGURE 2. Slider 343 is moved upwardly when motor 24 operates in a direction to raise the nose of the craft, and is centered when the elevators are streamlined. A rate taking network 349 associated with voltage divider 30 is shown to include a capacitor 350 and a resistor 351 grounded at 352.

Pitch attitude selector 52 of FIGURE 1 is shown in FIGURE 3 to comprise a voltage divider having a winding 353 and a slider 354 actuated through a mechanical connection 355 by motor 47. Slider 354 is moved upwardly by operation of motor 47 in response to the kind of signal which would energize motor 24 to cause the nose of the craft to rise.

A voltage divider 361 is shown to have a winding 362 and a slider 360 actuated through a mechanical connection 357 by pitch rate gyroscope 42. When the rate of rise of the nose of the craft increases, slider 360 is moved upwardly, and the slider is centered when the pitch rate of the craft is zero—that is, when the craft has no rate of pitch in either direction.

A voltage divider 366 is shown to have a winding 367, center tapped at 369, and a slider 365 actuated, through a third mechanical connection 364, by control stick 55 when the stick is moved about its pitch axis. Slider 365 is moved upward when the stick is moved so as to raise the nose of the craft and is centered when the stick is in its central, inoperative position about its pitch axis.

In the aircraft the motion of control stick 55 which actuates slider 365 is a fore-and-aft movement, the motion of the control stick which actuates slider 203 is a side-to-side movement, and the motion of the control stick which actuates slider 193 is a rotational movement about the axis of the stick.

A voltage divider 373 is shown to have a winding 374 and a slider 372 arranged for actuation by vertical gyroscope 32 through a second mechanical connection 370. Winding 374 is fastened to the craft, and since slider 372 is stabilized by the vertical gyroscope, any pitch of the craft results in movement of the winding with respect to the slider. Slider 372 apparently moves upwardly when the nose of the craft rises and is centered when the craft is level about the pitch axis.

A voltage divider 377 is shown to have a winding 380 and a slider 376 actuated through a third mechanical connection 371 by vertical gyroscope 32 when the craft rolls. Winding 380 is fastened to the craft, and since slider 376 is stabilized in the vertical gyroscope, any roll of the craft results in movement of the winding with respect to the slider. Slider 376 is normally at the lower end of winding 380 and is apparently displaced toward the upper end of the winding upon roll of the craft, regardless of which way the craft rolls, by a suitable link in mechanical connection 371. One suitable mechanism for this use will be described below in connection with FIGURE 7.

A voltage divider 385 is shown to have a slider 384 and a winding 386 which is metallized over a considerable portion of its effective length as indicated at 387. Slider 384 is actuated through a mechanical connection 383 by attack angle vane 44 and moves upward for increasing values of attack angle. For values of attack angle less than 13 degrees slider 384 rests, under the control of mechanical connection 383, on the metallized portion 387 of the winding. However, if the attack angle exceeds 13 degrees, slider 384 is displaced along winding 386 so that it rests upon the resistance portion rather than the metallized portion thereof and, when the attack angle reaches 17 degrees, slider 384 is at the upper end of its winding.

Associated with voltage divider 385 is a resistance-capacitance network 390 made up of resistors 391 and 392 and a capacitor 393, the latter being in parallel with resistor 391. The resistance-capacitance network acts as a differential voltage divider which attenuates signals of different frequencies differently, and which hence operates differently upon the constant and variable components of voltage impressed across it.

Vibrator 394 is like vibrator 134 and includes a movable contact 397 which is actuated by means of an energizing winding 400 to alternately engage a first fixed contact 401 and a second fixed contact 402. In the deenergized condition of winding 400 movable contact 397 does not engage either fixed contact.

Amplifier 26 is of the same type as amplifiers 21 and 15: associated therewith are a blocking capacitor 403, an input resistor 395, and an elevator engage relay supplying energizing voltage from amplifier 36 either to servomotor 24, like motor 19, or to centering motor 47, like motor 46.

As shown in FIGURE 3, pitch attitude network 63 energizes amplifier 64, through vibrator 397, from a summation terminal 412, to which are connected a plurality of summing resistors 413, 414 and 415.

A voltage divider 418 is shown as having a winding 417 and a slider 416 arranged to be adjusted manually.

Pitch attitude device 65 of FIGURE 1 is shown in FIGURE 3 to comprise a voltage divider having a winding 420 and a slider 421 actuated through a mechanical connection 422 by motor 62, to move upward when the angle of pitch of the craft increases.

Amplifier 64 is of the same type as amplifier 310 previously discussed, and motor 62 is like motor 34 except that the latter is designed to operate when energized with a lower alternating voltage.

Motor 62 drives an alternating voltage "velocity" generator 430 through a mechanical connection 427. Generator 430 is of the type in which the output voltage varies in amplitude, but remains fixed in frequency, as the speed of the generator changes. Associated with velocity generator 430 is a voltage divider 432 having a winding 431 and a slider 433 arranged for manual adjustment.

Pitch attitude indicator 61 is shown to comprise first index 435 and a second index 436, independently movable with respect to a fixed scale 437. Index 435 is actuated through mechanical connections 422 and 440 by motor 62, while slider 436 is actuated through mechanical connections 355 and 441 by motor 47. Accordingly, slider 436 indicates on scale 437 the actual pitch attitude of the craft, while slider 436 indicates on the same scale the selected pitch attitude of the craft. In normal operation of the system the two indices are in alignment.

Slider 421 of voltage divider 420 is moved upwardly as the indicated pitch attitude increases. Slider 416 is moved upwardly when it is desired to increase the indicated pitch attitude resulting from given settings of sliders 421 and 372.

FIGURE 4 is a somewhat more detailed showing of the relationship between members 24, 26, 47, and 66 of FIGURE 3. In FIGURE 4 there is shown a source 450 of direct voltage which need not be regulated, and which ordinarily comprises the battery of the aircraft: its negative terminal is grounded at 448. A master switch 447 is provided as also shown in FIGURE 5. From source 450 voltage is supplied to motors 24 and 47 of FIGURE 4 through elevator servo relays 451 and 452, engage relay 453, and manual selector 66. Up elevator relay 451 is shown to comprise a movable contact 454 which is actuated into engagement with a fixed contact 455 by an armature 456 when the winding 457 of the relay is energized. Down elevator relay 452 is shown to comprise a movable contact 465 which is actuated into engagement with a fixed contact 466 by an armature 467 when the winding 470 of the relay is energized. Elevator engage relay 453 is shown to comprise a winding 474 which actuates an armature 475, displacing a pair of movable contacts 476 and 477 out of normal engagement with a pair of fixed contacts 480 and 481 and into engagement with a second pair of fixed contacts 482 and 483, all respectively.

Motors 24 and 47 are shown in FIGURE 4: associated with the latter are a pair of resistors 479 and 492 of equal resistance, and the winding 485 of an antiengage relay 486 which will be discussed more fully in connection with FIGURE 5. Motor 24 is a reversible, series wound D.C. motor having a rotor 499, a first field winding 494 for up elevator operation and a second field winding 500 for down elevator operation. The connection between motor 24 and elevators 12 may include such gear reduction as is considered desirable, and also includes clutch 348. The purpose of this clutch is to disconnect the elevators and their normal manual control from motor 24 except when the automatic pilot is engaged, to permit normal non-automatic control of the elevators without requiring the human pilot to also drive servomotor 24 through the reduction gearing. The energizing circuit for the solenoid of clutch 348 will be traced in connection with FIGURE 5.

Except for relay 486, the subject matter thus far described in connection with FIGURE 4 is duplicated for servo amplifier 21 in the aileron control portion of the automatic pilot and for servo amplifier 15 in the rudder component of the automatic pilot.

Manual adjuster 66 is shown in FIGURE 4 to comprise a central manually operable contact 503, a pair of intermediate resilient contacts 504 and 505, and a further pair of fixed contacts 506 and 507. A pair of fixed resistors 517 and 520 are associated with adjuster 66.

When movable contact 503 is displaced upwardly by a slight amount it comes into engagement with intermediate contact 504. If movable contact 503 is displaced still further in upward position, additional engagement is made with fixed contact 506. If movable contact 503 is displaced slightly downward it comes into engagement with intermediate contact 505. If movable contact 503 is displaced still further in a downward direction, additional engagement is made with fixed contact 507.

An anti-stall relay 530 associated with the pitch attitude adjusting apparatus is shown in FIGURE 4 to include a winding 531 energizable to move an armature 532, displacing movable contacts 533 and 534 out of engagement with fixed contacts 535 and 536 respectively, and displacing movable contact 533 into engagement with a fixed contact 537, with which there is associated a resistor 542. Winding 531 is energizable under the control of a normally open switch 540, actuated by attack angle vane 44 through mechanical connection 383 whenever the actual attack angle exceeds 12½ degrees. Relay 530 is thus operated before slider 384 of FIGURE 3 moves off the metallized portion of winding 386.

FIGURE 5 shows many of the elements previously described and a number of new elements, and is presented to illustrate how the apparatus as a whole is controlled.

Directional gyroscope 31 is shown in the lower left portion of the figure, with leveling motor 33, precession motor 34, and caging motor 35, the latter in the right central portion of the figure. Vertical gyroscope 32 is shown at the bottom central portion of the figure with roll erection motor 36 and pitch erection motor 37. Yaw rate gyroscope 40, roll rate gyroscope 41, and pitch rate gyroscope 42 are shown to the right of vertical gyroscope 32. The rotors of all the gyroscopes are preferably driven by high speed induction motors, and the leveling, precessing and erection motors may be A.C. torque motors of the squirrel-cage type.

Turn control 53 is shown near the center of the figure to be arranged to actuate a movable contact 682 out of a central, inoperative position into engagement with one or the other of fixed contacts 684 and 685: this function is in addition to the operation of slider 234 shown in FIGURE 2.

Control stick 55, at the right of turn control 53, is shown to be arranged to actuate movable contacts 663, 664, and 665 out of central, inoperative positions into engagement with one or the other of fixed contacts 670 and 671, fixed contacts 672 and 673, and fixed contacts 674 and 675, all respectively, according as the control stick is displaced about one or more of its axes. These functions are in addition to the operation of sliders 193 and 203 in FIGURE 2 and of slider 365 in FIGURE 3.

Function selector 60 is shown in the upper central portion of the drawing to comprise a manual knob 555, carrying an index 556 movable with respect to a scale 557, and effective through a mechanical connection 560 to actuate the movable contacts 561, 562, 563, and 564 of a plurality of tap switches each having four positions corresponding to the graduations on scale 557.

Turn control relay 212 is shown just below function selector 60, and comprises a winding 594 which can be energized to actuate an armature 595, displacing movable contacts 241, 597, and 596 out of normal engagement with fixed contacts 242, 601, and 600: movable contact 597 is displaced into engagement with a further fixed contact 602.

The winding 217 of localizer relay 216 is shown to the left of turn control relay 212.

Control stick relay 243, just below turn control relay 212, is shown to comprise a winding 603 which may be energized to actuate an armature 604, displacing movable contacts 210, 605, and 606 out of normal engagement with fixed contacts 211, 607, and 610: movable contact 606 is displaced into engagement with a further fixed contact 611.

The winding 245 of output relay 244 is shown to the right of control stick 55, and the winding 275 of reverse relay 274 is shown to the left of localizer relay 216.

Precession relay 325 is shown to the left of turn control 53. The winding 327 of this relay actuates armature 326 to displace movable contact 323 into engagement with fixed contact 324, as shown in FIGURE 2, and also to displace a movable contact 632 out of normal engagement with a fixed contact 633.

Battery 450 and master switch 447 are shown in the upper left hand corner of the figure.

Elevator engage relay 453 is shown in the upper right portion of the figure. Winding 474 actuates armature 475 to displace movable contacts 476 and 477 with respect to fixed contacts 480, 481, 482, and 483, as described in connection with FIGURE 4, and also actuates movable contacts 725 and 726 into engagement with fixed contacts 727 and 730: movable contact 726 is displaced out of normal engagement with a further fixed contact 731. Associated with elevator engage relay 453 is an elevator disengage button 733 comprising a normally closed, momentarily operable single pole single throw switch.

Elevator solenoid 496 is also shown at the right of the drawing.

Anti-engage relay 486 is shown in the upper left portion of the drawing. Winding 485 of this relay actuates armature 489 to displace movable contact 551 out of normal engagement with fixed contact 552.

An inverter 521 is shown in the lower left portion of the drawing. This inverter provides all the alternating voltage used in the automatic pilot, including that required by a step down transformer 522 located directly below it in the drawing, and shown to have a primary winding 523 and a secondary winding 524.

In the lower right corner of the drawing is shown an erection cutout relay 541 having a winding 715 which may be energized to actuate an armature 717, displacing a movable contact 539 out of normal engagement with a fixed contact 538. A movable contact 712 is adjusted by yaw rate gyroscope 40 to engage one of two fixed contacts 706 and 707 when the aircraft is turning, to control the operation of relay 541. When the craft is not turning, no engagement between the contacts takes place.

In the upper left corner of the drawing there is shown a go around relay 554 having a winding 565 which may be energized to actuate an armature 566, displacing movable contacts 567, 570, and 571 into engagement with fixed contacts 572, 573, and 574: movable contacts 567 and 570 are displaced out of normal engagement with further fixed contacts 575 and 576. A signal lamp 690 is associated with go around relay 554.

A glide relay 584 is shown below movable contact 567 for the sake of completeness: in actual practice this relay is effective in the power control apparatus described in the copending attack angle control application referred to above, but has no function in the automatic pilot per se.

A go around button 586 near go around relay 554 is shown to comprise a normally open momentary contact single pole single throw switch. A master engage button 614 shown in the upper central portion of the drawing is of the same kind, as is a gyro button 631 in the center of the drawing. Gyro button 631, however, is mechanically operated and maintained operated, when function selector 60 is moved into its glide position, by a mechanical connection 629, and the same mechanical connection releases button 631 and retains it in released condition when the function selector is in its off position. In the in and out positions of the function selector, gyro button 631 may be operated manually, and if this is done, the button is maintained operated by suitable mechanical means until function selector 60 is again moved into its off position.

Extending across the upper portion of the figure is a master engage relay 616. This relay is shown to have a winding 615 which may be energized to actaute an armature 617, displacing movable contacts 620, 621, and 622 into engagement with fixed contacts 623, 624, and 625.

Caging relay 651 in the right central portion of the figure is shown to comprise a winding 650 which may be energized to actuate an armature 652, displacing movable contact 653 out of normal engagement with fixed contact 657 and into engagement with fixed contact 655.

Caging motor 35 is shown just below caging relay 651, and is provided with a mechanical connection 649 for caging and uncaging directional gyroscope 31. Motor 35 is a reversible shunt wound D.C. motor, and limit switches 658 and 659 are provided to deenergize the motor at each end of its travel.

In the lower central portion of the figure there is shown a transfer relay 740 having a winding 737 which may be energized to actuate an armature 741, displacing a movable contact 742 out of normal engagement with a first fixed contact 743 and into engagement with a second fixed contact 744. A signal lamp 757 is associated with transfer relay 740.

Just above lamp 757 is a flasher relay 752 having a winding 751 which may be energized to actuate an armature 753, displacing a movable contact 754 out of normal engagement with a fixed contact 755. Associated with relay 752 are a fixed resistor 747 and a flasher 750.

To the left of elevator engage relay 453, in the upper right portion of the drawing, are shown rudder and aileron engage relays 760 and 761, with which are associated rudder and aileron disengage buttons 762 and 763, like elevator disengage button 733, and rudder and aileron solenoids 764 and 765 like elevator engage solenoid 496. Aileron engage relay 761 is exactly like elevator engage relay 453: it includes a winding 770 which may be energized to actuate an armature 771, displacing movable contacts 772, 773, 774, and 775 into engagement with fixed contacts 776, 777, 780, and 781: movable contacts 772, 774, and 775 are displaced out of normal engagement with fixed contacts 782, 783, and 784.

Rudder engage relay 760 is like the aileron and elevator engage relays, except that it has one additional fixed contact. Its winding 785 may be energized to actuate an armature 786, displacing movable contacts 787, 790, 791, and 792 into engagement with fixed contact 793, 794, 795, and 796 and out of normal engagement with fixed contacts 797, 800, 801, and 802.

FIGURE 5 shows the basic structure of an automatic pilot according to the invention, but an improved embodiment includes further components shown best in FIGURE 7. To avoid confusing the drawing, only those portions of FIGURE 5 have been reproduced in FIGURE 7 which are necessary to an understanding of the additional components. It must be understood however, that all the other apparatus of FIGURE 5 functions simultaneously with the apparatus of FIGURE 7.

The basic additional function performed by the apparatus of FIGURE 7 is automatic control of the elevators of the craft so that it continues at a selected altitude. The altitude control apparatus is put into operation by closure of a switch 900 shown in the upper right hand corner of FIGURE 7 to comprise a pair of fixed contacts 901 and 902 which may be engaged by a pair of movable contacts 903 and 904 simultaneously operable by a manual lever 905.

Switch 900 controls the operation of a relay 906 having a winding 907 which actuates an armature 910 to displace movable contacts 911 and 912 out of normal engagement with fixed contacts 913 and 914 respectively, and to displace a movable contact 915 into engagement with a fixed contact 916.

Three further relays govern the operation of the altitude control apparatus. Two of these are shown below the structure just described: relay 917 is shown to have a winding 920 energizable to actuate an armature 921, displacing a movable contact 922 out of normal engagement with a first fixed contact 923 and into engagement with a second fixed contact 924; and relay 925 is shown to have a winding 926 energizable to actuate an armature 927, displacing a movable contact 930 into engagement with a fixed contact 931.

The third relay 932 is shown in the left central portion of FIGURE 7 to comprise a winding 933 energizable to actuate an armature 934, displacing a first movable contact 935 out of normal engagement with a first fixed contact 936, and displacing a second movable contact 937 into engagement with a second fixed contact 940.

Operation of the altitude control apparatus takes place in accordance with the response of an altitude sensor 941, shown to comprise an evacuated and sealed bellows 942 connected at 943 to one end of a lever 944 pivoted at 945. The other end of lever 944 carries a movable plate 946 for displacement relative to two fixed plates 947 and 950. A tension spring 951 is connected at one end to lever 944, on the same side of pivot 945 as plate 946, and at the other end to a rack 952 drivingly engaged by a pinion 953.

Plates 947 and 950 are energized from the secondary winding 954 of a transformer 955 having a primary winding 956: secondary winding 954 is center tapped at 957.

Pinion 953 is driven through a mechanical connection 960 by a servo motor 961, whose energization is controlled by an amplifier 962 through a cable 963. Amplifier 962 has power terminals 964 and 965 and input terminals 966 and 967, the latter terminals being energized from sensor 941 and from a voltage divider 970, having a winding 971 and a slider 972. The voltage divider is energized through a phasing capacitor 969 with the output of a velocity generator 973 driven through mechanical connection 960 by servo motor 961.

Mechanical connection 960 is continued, through a normally disengaged, electrically engageable clutch 974, to adjust the position of a movable contact 980 with respect to opposed fixed contact segments 981 and 982, and to adjust the slider 975 of a voltage divider 976 having a winding 977. Slider 975 is initially set so that it is midway along winding 977 when contact 980 is midway between segments 981 and 982. A further voltage divider 983 having a winding 984 and a manually operable slider 985 is associated with voltage divider 976, and a pair of springs 978 and 979 normally urge slider 975 into a central position along winding 977.

Winding 977 of voltage divider 976 is energized from terminals 8 and 9 of D.C. source 70, as is the winding 988 of a further voltage divider 986 having a slider 987. A further voltage divider 990 having a slider 991 and a winding 992 is associated with voltage divider 986.

Slider 987 is actuated through mechanical connection 993 by a reset motor 994 having a rotor 995 and a pair of field windings 996 and 997. A capacitor 1000 is associated with the windings of motor 994 to give split phase operation as is well known. A contact 1005 movable to engage either of two fixed contact segments 1007 and 1006 is also actuated by motor 994 through mechanical connection 993; the initial adjustment is such that slider 987 is midway along winding 985 when contact 1005 is midway between a pair of contact segments.

Operation of motor 994 is controlled by a pair of relays 1010 and 1011 shown below it. Relay 1010 is shown to have a winding 1012 energizable to actuate an armature 1013, displacing movable contact 1014 out of normal engagement with fixed contact 1016, and displacing movable contact 1015 into engagement with fixed contact 1017. Relay 1011 is shown to have a winding 1020 energizable to actuate an armature 1021, displacing movable contact 1022 out of normal engagement with fixed contact 1024, and contact 1023 into engagement with fixed contact 1025.

A pair of summing resistors 1026 and 1027 connect sliders 985 and 991 with summation terminal 332 in the elevator channel of the automatic pilot, described in connection with FIGURE 3.

FIGURE 6, referred to above, is a fragmentary showing of one means for causing the desired operation of voltage divider 377. Mechanical connection 371 of FIGURE 3 is shown in FIGURE 8 to include an arm 1050 stabilized in position by vertical gyroscope 32 with respect to the roll axis of the craft. Arm 1050 is connected through a tension strand 1051 with the longer arm 1052 of a bell crank 1053 pivoted at 1054 to the frame of the craft, and resiliently connected thereto by a tension spring 1055. The shorter arm 1056 of bell crank 1053 insulatingly carries slider 376 of voltage divider 377, whose winding 380 is fixed to the craft and is shown as tapered.

If the craft rolls arm 1050 apparently rotates with respect to the craft causing counterclockwise rotation of bell crank 1053 and hence upward apparent displacement of slider 376 along winding 377, regardless of the sense of the pitch.

Operation

In analyzing the operation of this automatic pilot, the condition of an aircraft which has been in a hangar and which has just been brought out on to the runway preparatory to starting upon a flight will first be considered. Under these conditions the control surfaces are held in streamlined position by control locks, the turn control, control stick, function selector, and pitch attitude selector are in their inoperative positions, the directional gyroscope is caged parallel to the longitudinal axis of the craft and to its floor, the rate gyroscopes are centralized by their springs, the instrument landing receiver is turned off, the air speed is zero, and altitude sensor 941 is in a condition determined by the pressure altitude of the airport. The centering motors, altitude reset motor, vertical gyroscope, and attack angle vane are in random positions determined by the history of the craft since the last flight. This means that the sliders 84, 114, 121, 126, 165, 193, 203, 234, 266, 304, 343, 360, 365, and 975 are at the centers of their windings, and that the positions of plate 946, contacts 980 and 1005, and sliders 103, 107, 186, 231, 354, 372, 376, 384, 421, and 987 are random. Sliders 90, 172, and 190 are near the grounded ends of their windings. Sliders 261, 307, 416, 433, 972, 985, and 991 are in the positions to which they were last manually set. All relays are in the positions shown in FIGURES 2, 3, 4, 5, and 7, switches 447, 586, 614, 631, 659, and 900 are open, switches 658, 733, 762, and 763 are closed, movable contacts 663, 664, 665, 682, and 712 make no contacts, clutch 974 is deenergized and indexes 435 and 436 are at random positions on scale 437.

It is convenient to be able to disable the stall prevention portion of the apparatus when the craft is on the ground, and this can be done by a plurality of switches which are provided. Switch 1200, shown in FIGURE 3, is normally closed, and if it is opened the electrical energization of one portion the straight stall prevention circuit is interrupted. Switch 1201, shown in FIGURE 2, is normally open, and if it is closed the voltage supplied by the turn control circuit is rendered independent of the position of bank stall prevention slider 231. Switch 1202, shown in FIGURE 4, is normally closed, and if it is opened the electrical energization of the rest of the straight stall prevention circuit is interrupted.

Initial Energization

The first step in putting the automatic pilot into operation is to close master switch 447. This completes a circuit which may be traced from the positive terminal of source 450 through and conductor 528, switch 447, conductors 529 and 543 to inverter 521, the circuit being completed through ground connections 449 and 448. Operation of inverter 521 results, and alternating voltage is supplied to the spin motors of all the rate gyroscopes and the directional gyroscope, as shown in FIGURE 5. Alternating voltage is also supplied to the primary winding 523 of transformer 522, whose secondary winding 524 is connected to energize leveling motor 33 of directional gyroscope 31 and pitch erection motor 37 of vertical gyroscope 32 directly. Secondary winding 524 also energizes roll erection motor 36 of vertical gyroscope 32 through contacts 538 and 539 of erection cutout relay 541.

The output voltage from inverter 521 is also supplied to a terminal 549, to which are connected a number of components of the automatic pilot, as shown in FIGURES 2, 3, and 5. These components include amplifiers 15, 21, 26, and 64, vibrators 134 and 394, transformers 297, 321, and 955, amplifier 319, coupler 57, the primary winding of velocity generator 430, and the line phase winding of motor 62, the latter connection including a quadrature capacitor 521. Phasing capacitors may be interposed between terminal 549 and vibrators 134 and 394 if desired.

It will be observed that the input to coupler 57 is short-circuited by contacts 223 and 224 of relay 216. Under these conditions the coupler operates to set sliders 266 and 304 at the centers of windings 270 and 302: when they reach these positions, coupler 57 remains inoperative.

The plate voltage for amplifiers 15, 21, 26, 64, 310, and 962 may be supplied by batteries if desired, but is more conveniently supplied from the alternating voltage line of the aircraft. In the latter case a suitable power supply is of course to be connected to terminal 549, and may be energized upon closure of master switch 447.

According to conventional practice the filament or heater circuits for electron discharge devices included in the amplifiers have been omitted from the drawing, but it will be appreciated that these circuits must be energized before operation of the automatic pilot can take place, and it is assumed that such energization has been accomplished by any suitable means.

If source 70 is made up of a plurality of batteries, these should now be connected to positive terminal 8 and negative terminal 9. If the regulated power supply is an electronic arrangement energized from inverter 521 or source 450, its circuit should now be completed. Source 70 is connected to energize the windings of most of the voltage dividers incorporated in the automatic pilot, as follows. Positive terminal 8 is connected to the upper terminals of windings 83, 106, 113, 120, 125, 167, 342, 362, 374, 380, 386 (through switch 1200), 417, and 420, to the lower terminals of windings 102, 185, 195, 205, 236, 353, 367, 977, and 985, and to fixed contacts 277 and 280 of relay 274. The remaining terminal of each of windings 380 and 386 is grounded, while the remaining terminals of the rest of the windings, and fixed contacts 276 and 281 of relay 274, are connected to the negative terminal 9 of source 70. Center taps 206, 237, and 369 are grounded, and thus provide a low impedance return path to the mid point of source 70, and one end of each of windings 984 and 992 is also grounded.

Closure of master switch 447 completes a circuit shown in FIGURE 5 from the positive terminal of source 450 through conductor 528, switch 447, conductors 529, 550, 692, 745, and 746, resistor 747, and flasher 750 to winding 751 of flasher relay 752. Relay 752 accordingly begins a continuous cycle of intermittent operation under the control of the flasher.

From conductor 692 the circuit from the positive terminal of source 450 may be further traced through conductors 693, 694, and 804, contacts 790 and 800 of rudder engage relay 760 and conductor 803, to the windings 650 and 245 of caging relay 651 and output relay 244, each of these relays accordingly being operated.

Caging relay 651 completes the circuit from conductor 692, shown above to be positive, through conductors 693, 694, 695, 696, and 698, and contacts 653 and 655 of caging relay 651 to limit switch 659. Since the directional gyroscope is at present fully caged, the circuit from the limit switch to the caging winding of motor 35 is open.

Output relay 244 as shown in FIGURE 2 connects one end of summing resistor 164 to ground through conductor 283, contacts 252 and 254 of the output relay and ground connection 282. The effect of this will be described below. Output relay 244 also connects amplifier 310 to slider 307 through contacts 255 and 257 of the output relay. Slider 304 of voltage divider 303 is centered, however, so that it is at ground potential and no voltage is impressed on winding 305: amplifier 310 accordingly has no input voltage impressed upon it, and supplies no output to transformer 312.

Closing of master switch 447 also energizes transfer relay 740, shown in FIGURE 5, through a circuit which may be traced from winding 737 of the relay through conductors 736 and 810, contacts 797 and 787 of rudder engage relay 760, and conductor 806, or through conductors 736 and 812, contacts 731 and 726 of elevator engage relay 453, and conductors 729, 704, 703, 702, 701, 700, 697, and 696, or through conductors 736 and 811, contacts 782 and 772 of aileron engage relay 761, and conductor, 807, 701, 700, 697, and 696, to conductor 695 which has been shown to be positive. Transfer relay 740 thus energized displaces movable contact 742 into engagement with fixed contact 744.

The movable contact 397 of vibrator 394 is oscillated between engagement with and disengagement from fixed contact 401, which is connected to summation terminal 332. By this means the voltage on summation terminal 332 is chopped to convert it to a periodic voltage having the frequency of inverter 521, and the fundamental component of the resulting square wave is applied to amplifier 26 through blocking condenser 403.

The voltage on terminal 332 when ungrounded is the resultant or "parallel sum" of voltages applied thereto through summing resistors 333 to 339 inclusive. Thus summing resistor 333 is connected to summation terminal 332, and, through capacitor 350 of resistance-capacitance network 349, to slider 343. Summing resistor 334 is connected to summation terminal 332, by conductor 356, and to slider 354. Summing resistor 335 is connected to summation terminal 332, by conductors 363 and 356, and to slider 360. Summing resistor 336 is connected to summation terminal 332, by conductors 368, 363, and 356, and to slider 365. Summing resistor 337 is connected to summation terminal 332, by conductors 375, 368, 363, and 356, and to slider 372. Summing resistor 338 is connected to summation terminal 332, by conductors 382, 375, 368, 363, and 356, and to slider 376. Finally, summing resistor 339 is connected to summation terminal 332, by conductors 382, 375, 368, 363, and 356, and to slider 384, through resistance-capacitance network 390. The magnitudes of the voltages on sliders 354, 360, 365, 372, and 376, the rate of change of the voltage on slider 343, and the magnitude and rate of change of the voltage on slider 384 determine the voltages supplied through the summing resistors to summation terminal 332, which assumes a voltage to ground determined by all the voltages applied to the summing resistors. This process of "parallel addition of voltages" is known in the art, and it is well known that desired relative effects may be given the various voltages by proper selection of values for the summing resistors.

Considering the random position of sliders 354, 372, 376, and 384, it is apparent that the voltages applied to summation terminal 332 through the summing resistors in all probability do not total zero. Summation terminal 332 takes a positive or negative value accordingly, and a square wave input of a corresponding magnitude is impressed on amplifier 26, the square wave voltage being in phase or 180° out of phase with the alternating voltage energizing the vibrator, according as the voltage on summation terminal 332 is positive or negative with respect to ground.

For the sake of illustration, suppose that the voltage at summation terminal 332 is positive when the terminal is ungrounded. The voltage supplied to amplifier 26 by vibrator 394 is in phase with that supplied to amplifier 26 at terminal 549, and down elevator relay 452 of FIGURE 4 is energized. This completes a circuit from the positive terminal of source 450 through conductor 528, master switch 447, conductors 464, 463, 473, and 472, contacts 465 and 466 of relay 452, conductor 490, contacts 477 and 481 of elevator engage relay 453, conductor 491, the winding of motor 47, resistor 492, conductors 488 and 484, and winding 485 of anti-engage relay 486 to ground connector 487. By this circuit the winding of the relay is energized, and this interrupts the supply of voltage from source 450 through conductor 528, master switch 447 and conductors 529, 550, and 553.

Thus energized, motor 47 operates in a direction to drive slider 354 upwardly as seen in FIGURE 3, decreasing the positive potential on summation terminal 332 until it becomes zero. When this condition is reached no voltage is impressed on the input to amplifier 26 by vibrator 394, operation of motor 47 ceases, and energization of winding 485 of anti-engage relay 486 from this source is interrupted. The initial setting of slider 354 is such that when no voltage from any other summing resistor is on summation terminal 332, slide 354 is at the center of its winding.

If under the same initial circumstances the voltage on summation terminal 332 is negative rather than positive when the terminal is ungrounded, the voltage applied to amplifier 26 by vibrator 394 is 180° out of phase with that supplied to amplifier 26 at terminal 549, and up elevator relay 451 of FIGURE 4 is energized. This completes a circuit which may be traced from the positive terminal of source 450 through conductor 528, master switch 447, conductors 464, 463, and 462, contacts 454 and 455 of relay 451, conductor 468, contacts 476 and 480 of elevator engage relay 453, conductor 478, the winding of motor 47, resistor 479, conductors 488 and 484, and the winding 485 of anti-engage relay 486 to ground. Relay 406 is again energized to interrupt the circuit between contacts 551 and 552 of FIGURE 5.

Operation of motor 47 is this time in the opposite direction, moving slider 354 downwardly as seen in FIGURE 3 to decrease the negative voltage on summation terminal 332 until it reaches a zero potential. When this condition is reached, no signal is applied to the input of amplifier 26 by vibrator 394, operation of motor 47 ceases, and energization of winding 485 of anti-engage relay 486 from this source in interrupted.

At the same time that motor 47 adjusts slider 354, it also adjusts index 436 with respect to scale 437, the initial setting of the index with respect to the scale being such that when slider 354 is at the center of winding 353, index 436 is at a central zero indication on scale 437.

The elevator channel of the automatic pilot was traced first because FIGURE 4 explicitly shows the interconnections just described joining amplifier 26, elevator engage relay 453, anti-engage relay 486, and motor 47, as well as motor 24 discussed below. It will be appreciated that the same inter-relation exists among amplifier 21, aileron engage relay 761, anti-engage relay 486 and motors 19 and 46, and among amplifier 15, rudder engage relay 760, anti-engage relay 486, and motors 13 and 45.

The voltage at summation terminal 73, which is connected to fixed contact 141 of vibrator 134, is the resultant of those impressed thereon through the summing resistors associated therewith. Thus the voltage between slider 84 and ground is impressed across resistor 88 and the winding 86 of voltage divider 87, and slider 90 is connected to the summation terminal 73 through summing resistor 74. Slider 103 is connected to summation terminal 73 through summing resistor 75. Slider 107 is connected to summation terminal 73 through summing resistor 76 and conductor 111. Slider 114 is connected to summation terminal 73 through summing resistor 77 and conductors 116 and 111. Slider 121 is connected to summation terminal 73 through summing resistor 80 and conductors 123, 116, and 111. Slider 234 is connected to summation terminal 73 through conductor 240, contacts 241 and 242 of turn control relay 212, conductor 214, contacts 215 and 221 of localizer relay 216, conductor 226, the portion of winding 227 to the left of slider 231, the slider, conductor 133, summing resistor 82 and conductors 136, 123, 116, and 111. Slider 203 is connected to summation terminal 73 through conductor 207, contacts 210 and 211 of control stick relay 243, conductors 213 and 214, and the circuit therefrom just traced.

Since sliders 84, 114, 121, 203, and 234 are centered, the voltage on summation terminal 73 is determined by the positions of sliders 103 and 107: if the joint effect of these voltages is not zero, an alternating voltage is impressed on amplifier 21 by vibrator 134, and motor 46 is energized to adjust slider 103 until the voltage at summation terminal 73 is zero. Slider 103 is initially set to be at the center of its winding when no voltage from any summing resistor in the aileron channel is on summation terminal 73.

Motor 46 is energized from the positive terminal of source 450 by a circuit which may be traced, in FIGURE 4, through conductor 528, switch 447, conductors 464, 463, and 473 to a conductor 501. From here the circuit repeats that already explained: conductor 501 is connected to the contacts of the servo relays of amplifier 26 and thence, see FIGURE 5, through movable contacts 774 and fixed contact 783 or through movable contact 775 and fixed contact 784 of aileron engage relay 761 to motor 46 of FIGURE 2, the circuit being completed through a conductor 502 to conductor 484 of FIGURE 4, and thence to winding 485 of anti-engage relay 486. Thus, even though the elevator control network may be balanced, anti-engage relay 486 remains energized until the aileron control network is also balanced.

The rudder channel of the automatic pilot is generally like the elevator and aileron channels previously described. Amplifier 15 is energized in accordance with the voltage on summation terminal 153, which is connected to fixed contact 142 of vibrator 134. It will be seen that the square wave voltage impressed on amplifier 15 is 180 degrees out of phase to that impressed on amplifier 21, because contact 141 is grounded when contact 142 is not, and vice versa. The connection of motor 45 to the relays of amplifier 15 is made with this in mind, to give the desired direction of rotation for a desired polarity of signals on terminal 153.

The voltage on summation terminal 153 is the resultant of those supplied through the summing resistors associated therewith. Thus, the voltage between slider 165 and ground is impressed across resistor 169 and winding 170 of voltage divider 171, and slider 172 is connected to summation terminals 153 through summing resistor 154 and conductors 181, 180, 177, 176, 175, 174, and 173. Slider 186 is connected to summation terminal 153 by summing resistor 155 and conductors 180, 177, 176, 175, 174, and 173. Slider 193 is connected to summation terminal 153 through summing resistor 156 and conductors 177, 176, 175, 174, and 173. Slider 126 is connected to summation terminal 153 through network 128, summing resistor 157, and conductors 175, 174, and 173. Slider 121 is connected to summation terminal 153 through summing resistor 160 and conductors 174 and 173. Slider 114 is connected to summation terminal 153 through summing resistor 161 and conductor 173. Winding 192 of voltage divider 191 is connected between slider 231 of voltage divider 230 and ground by conductor 133 and resistor 189, and slider 190 of voltage divider 191 is connected to summation terminal 153 through summing resistor 163 and conductors 174 and 173. One end of resistor 164 is connected to summation terminal 153 through conductors 176, 175, 174, and 173: the other end of the resistor is grounded as described above, however, so no voltage is applied to summation terminal 153 through resistor 164.

Since sliders 114, 121, 126, 165, 193, 203, and 234 are centered, the voltage on summation terminal 153 is determined by that on slider 186, and motor 45 adjusts the latter to zero. The relation between motor 45, amplifier 15, relay 760 and motor 13 is the same as in the elevator and aileron channels. Motor 45 is energized by a circuit which may be traced in FIGURE 4, through conductor 528 to conductor 501 as previously described; conductor 501 is connected to the contacts of the servo relays of amplifier 26 and thence through movable contact 791 and fixed contact 801 or movable contact 792 and fixed contact 802 of rudder engage relay 760 to motor 45 of FIGURE 2, the circuit being completed through conductor 502 to conductor 484 and thence to the winding 485 of anti-engage relay 486. The contacts of this relay accordingly cannot close until all three control channels are balanced simultaneously. Slider 186 is initially set so that it is centered when the voltages on all the summation resistors in the rudder channel are zero.

If the craft yaws, slider 126 is displaced from the center of its winding in proportion to the rate of the yaw. The voltage from this source is of course zero for no yaw, and hence has no effect on amplifier 15 for this condition. It has been found desirable however, to prevent any signal from reaching the amplifier from the yaw into gyroscope when the craft is changing heading at a constant rate, and this is accomplished by means of network 128. As long as slider 126 is not moving, the voltage between the slider and ground is constant, and hence is not transmitted through capacitor 129 to summing resistor 157. The craft can accordingly perform turns at constant rate without any modification of the operation of the automatic pilot from the yaw rate gyroscope, while at the same time any irregularity in the rate of turn is available for corrective purposes.

The advantage of this arrangement is not difficult to perceive. In normal straight flight a yaw rate gyroscope serves a useful purpose, since it gives a signal indicating that the heading of the craft is about to change, and so initiates corrective action by the automatic pilot, before enough change has actually occurred to be effective upon the directional gyroscope at all. Intentional changes in heading are usually accomplished at a constant rate, which depends on the craft's airspeed, and in the absence of some special provision would result in a constant signal from the yaw rate gyroscope tending to stop the turns. This can of course be avoided by locking the rate gyroscope during turns, but such a procedure takes away the desirable stabilizing signal which the yaw rate gyroscope gives if the turn is not proceeding to a constant rate. Provison of network 128 makes it possible to retain this desirable feature while eliminating the undesirable signal as long as the turn is actually taking place at a constant rate.

Turning once more to FIGURE 3, the voltage on summation terminal 412 in the pitch attitude indicator channel is the resultant of those supplied through the summing resistors associated therewith. Slider 372 is connected to summation terminal 412 through summing resistor 413 and conductor 419. Slider 416 is connected to summation terminal 412 through summing resistor 414 and conductors 425 and 419. Slider 421 is connected to summation terminal 412 through summing resistor 415 and conductors 423, 425, and 419. Slider 421 is initially set so that it is centered when index 425 is at the central zero indication of scale 437.

The voltage on summation terminal 412, which is connected to fixed contact 402 of vibrator 394, controls the operation of motor 62 just as operation of motor 47 in the elevator channel is controlled, to adjust the voltage to zero by moving slider 421. Generator 430 is driven when motor 62 operates, impressing a voltage of the frequency of inverter 521 across winding 431 of voltage divider 432, in amplitude determined by the speed of the motor. A selected portion of this voltage is taken by slider 433 and impressed on the input to amplifier 64 through conductor 434 and a summing resistor 438, to give this channel anti-hunt properties.

The four channels of the automatic pilot become balanced rapidly when master switch 447 is closed, and the gyroscopes also begin to come up to speed. No change in the rate gyroscopes or the directional gyroscope results, but the erection motors of the vertical gyroscope become operative and displace slider 107 of FIGURE 2 and sliders 372 and 376 of FIGURE 3 to new positions. Assuming the craft to be on level ground, slides 107 and 376 soon become centered, and slider 372 is brought to a position corresponding to the actual nose-high attitude of the craft, which may for example be eleven degrees. Adjustment of these sliders unbalances the aileron, elevator and pitch attitude indicator channels of the automatic pilot, energizing motors 46, 47, and 62 to readjust sliders 103, 354, and 421 until the channels are again balanced, and also positions indexes 436 and 435 on scale 437. These indexes come to the same rest position, although they do not necessarily reach it at the same instant because of the different rates of operation of motors 47 and 62. In point of fact, the initial balance of the channels first described and the erection of the vertical gyroscope may be one continuous process, so that the winding of anti-engage relay 486 is not deenergized until both steps have been completed.

When the anti-engage relay is deenergized, a circuit is completed from conductor 550 in FIGURE 5, previously shown to be positive, through conductor 553, contacts 551 and 552 of anti-engage relay 486, conductor 591, contacts 570 and 576 of go around relay 554, conductor 577 movable contact 562 of function selector 60, conductor 612, contacts 596 and 600 of turn control relay 212, contacts 605 and 607 of control stick relay 243, conductor 609, contact 754 and 755 of flasher relay 752, conductor 756, and contacts 744 and 742 of transfer relay 740 to signal lamp 757, and this circuit is interrupted each time contacts 754 and 755 of the flasher relay 751 open. Lamp 757 accordingly begins to flash, indicating that the automatic pilot has assumed a completely balanced condition.

The craft now takes off under manual control of the human pilot. During the takeoff the craft changes in attitude and undergoes accelerations about all three axes, so that operation of motors 45, 46, 47, and 62 is required and relay 486 is operated, interrupting the flashing of lamp 767. Ultimately, however, the craft is brought to a condition of stable flight at a selected cruising speed, which means that the ailerons, elevators and rudders are stationary, that the craft is proceeding at a constant airspeed, with a level roll attitude and a selected pitch attitude, heading, attack angle and rate of climb: the latter is normally zero, so that the craft proceeds at a constant altitude. After the channels of the automatic pilot have again become balanced, and lamp 757 again begins to flash, the human pilot may place the automatic pilot in control of the craft by pressing momentarily on engage button 614.

*Automatic Pilot Engagement*

While button 614 is held closed, an energizing circuit for winding 615 of master engage relay 616 may be traced through the button, conductor 613, contacts 607 and 605 of control stick relay 243, contacts 600 and 596 of turn control relay 212, conductor 612, movable contact 562 of function selector 60, conductor 577, contacts 576 and 570 of go around relay 554, conductor 591, contacts 552 and 551 of anti-engage relay 486, and conductors 553, 550, and 529 to master switch 447. It is thus apparent that master engage relay 616 can be energized only when the elevator, aileron, and rudder channels of the automatic pilot are all balanced, when the go around, turn control, and control stick relays are deenergized, and when the function selector is in its off position.

Master engage relay 616 operates when its winding is energized. Elevator engage relay 453 is energized thereby from positive conductor 702 through contacts 625 and 622 of relay 616, conductor 739, winding 454 of relay 453, and disengage button 733. The resulting operation of relay 453 completes a holding circuit from positive conductor 703 through conductor 728, contacts 725 and 727 of relay 453, conductor 732, winding 454, and disengage button 733: thus subsequent deenergization of master engage relay 616 cannot cause elevator engage relay 453 to drop out, although operation of button 733 at any time will do so. Operation of the latter relay also interrupts, at contacts 726 and 731, one of the circuits energizing the winding 737 of transfer relay 740, and energizes elevator engage solenoid 496 through conductor 734, contacts 730 and 726 of relay 453, and conductor 729, from positive conductor 704: motor 24 can now adjust the elevators of the craft.

Energization of relay 453 is also effective, as shown in FIGURE 4, to displace movable contacts 476 and 477 out of normal engagement with fixed contacts 480 and 481, and into engagement with fixed contacts 482 and 483. The circuit for energizing motor 47 from source 450 is hence interrupted, so that operation of relay 451 or relay 452 has no effect on motor 47, and slider 354 of FIGURE 3 remains where it was last set by operation of motor 47.

The normal condition of the elevator control network is that in which sliders 343, 354, 360, 365, and 372 are at the centers of their respective windings, and hence at ground potential. Slider 376, normally at the bottom of winding 380, is also normally at ground potential. For all normal flight conditions slider 384 is on the metallized portion of winding 386, and hence is also at ground potential. Under these conditions no signal is supplied to amplifier 26, and neither relay 451 nor relay 452 is energized. The normal condition of the network is not the only one in which the amplifier input is zero, of course: many sets of positions of the sliders result in a zero input to the amplifier, and this condition of zero input is the "balanced" condition of the network. The operation of motor 47 continuously adjusts slider 360 as necessary to maintain balance of the network, as pointed out above, so that master engage button 614 may be operated whenever lamp 757 is flashing, without any further consideration.

Any change in the pitch attitude of the craft occurring after the elevator servomotor has been engaged has the effect on unbalancing the elevator network and hence of supplying a voltage to summation terminal 332. For example, suppose a gust tilts the nose of the craft upward. Slider 372 is moved apparently upward by vertical gyroscope 32 in accordance with the amount of the tilt, and slider 360 is moved upward by the pitch rate gyroscope 42 in accordance with the rate of the tilt. Each of these slider movements results in the application of a positive voltage to summation terminal 332, and amplifier 26 is energized in a sense to energize down elevator relay 452. Operation of relay 452 completes a circuit which may be traced in FIGURE 4 from the positive terminal of source 450 through conductor 528, master switch 447, conductors 464, 463, 473, and 472, contacts 465 and 466 of down elevator relay 452, conductor 490, contacts 477 and 483 of elevator engage relay 453, conductor 497, field winding 500 and rotor 499 of motor 24, and ground connection 495. Motor 24 is thus energized, and rotates in a direction to lower the elevator and hence raise the tail and lower the nose of the craft. This operation of motor 24 also displaces slider 343 downwardly, so that the slider becomes negative with respect to ground, and the voltage on slider 343 is impressed across capacitor 350 and resistor 351 which are connected in series at a common terminal 498.

Capacitor 350 begins to charge in accordance with the voltage impressed across the series circuit. At the instant when the voltage is applied, it all appears across resistor 351 because of the IR drop therein resulting from the flow of charging current for the capacitor, and terminal 498 is at the same potential as slider 343. As the latter becomes more fully charged a greater proportion of the applied voltage appears across it and a smaller proportion appears across the resistor, until after an interval the entire voltage appears across the capacitor and terminal 498 is once again at ground potential. If the applied voltage changes during this interval, by reason of further adjustment of slider 343, the fully charged condition of capacitor 350 is reached sooner or not so soon, but the general operation of the circuit is the same.

It was pointed out that slider 343 is displaced upwards along winding 342 by operation of motor 24; the resulting transient voltage on terminal 498 is impressed on summation terminal 332 through summing resistor 333. If no change in the attitude of the craft occurs immediately, motor 24 runs until the transient voltage becomes equal and opposite to the combined voltages from sliders 360 and 362, when the input to amplifier 26 becomes zero and motor 24 stops.

The inertia of the craft is not ordinarily so great, however, and operation of the elevators begins almost at once first to arrest the pitching of the craft and then to raise the tail of the craft and thus restore its original pitch attitude. In the course of this operation pitch rate gyroscope 42 first returns slider 360 to its center position, then displaces it in the opposite direction, and finally returns it to its central position, and vertical gyroscope 32 returns slider 372 toward its initial position. Voltages from sliders 360 and 372 and from terminal 498 are now impressed on summation terminal 332, the first two being permanent voltages determined only by the positions of the sliders, and the third being a transient voltage which decays with discharge of capacitor 350. If by the time the capacitor plates reach the same potential slider 360 has returned to its central position and slider 372 has returned to its initial position, relay 452 is deenergized, and operation of motor 24 ceases. Until this condition is reached, motor 24 continues to adjust slider 343, and the elevators of the craft, to introduce or remove correction voltage as necessary to cause the craft to continue in the desired pitch attitude.

If the initial deviation of the craft from the balanced condition is in the opposite direction, the nose of the craft dropping rather than rising, the voltage on summation terminal 332 is negative rather than positive, and amplifier 26 energizes up elevator relay 451. A circuit may now be traced in FIGURE 4 from the positive terminal of source 450 through conductor 528, master switch 447, conductors 464, 463, and 462, contacts 454 and 455 of up elevator relay 451, conductor 468, contacts 476 and 482 of elevator engage relay 453, conductor 493, and field winding 494 and rotor 499 of motor 24, to ground connection 495. Motor 24 now operates in the reverse direction, and the rebalancing of the network proceeds as described above, but in the reverse sense.

Turning now to the aileron channel of the automatic pilot, aileron engage relay 761 is energized, upon operation of master engage relay 616, by a circuit which may be traced in FIGURE 5 from positive conductor 697 through contacts 624 and 621 of relay 616, conductor 778, winding 770 of relay 761, and disengage button 763. The resulting operation of relay 761 completes a holding circuit from positive conductor 700 through conductor 805, contacts 773 and 777 of aileron engage relay 761, conductor 779, winding 770, and disengage button 763; thus subsequent deenergization of master engage relay 616 cannot cause aileron engage relay 761 to drop out, although operation of button 763 at any time will do so. Operation of the latter relay also interrupts, at contacts 772 and 782, one of the circuits energizing the winding of transfer relay 740, and energizes aileron engage solenoid 765, through contacts 776 and 772 of relay 761 and conductor 807, from positive conductor 701; motor 19 can now adjust the ailerons of the craft.

Rudder engage relay 760 is also energized, upon operation of master engage relay 616, by a circuit which may be traced from positive conductor 693 through contacts 623 and 620 of relay 616, conductor 788, winding 785 of relay 760, and disengage button 762. The resulting operation of relay 760 completes a holding circuit from positive conductor 694 through conductor 804, contacts 790 and 794 of rudder engage relay 760, conductor 789, winding 785, and disengage button 762; thus subsequent deenergization of master engage relay 616 cannot cause rudder engage relay 760 to drop out, although operation of button 762 at any time will do so. Operation of relay 760 also interrupts, at contacts 787 and 797, one of the circuits energizing the winding of transfer relay 740, and energizes rudder engage solenoid 764 through contacts 793 and 787 of relay 760 and conductor 806, from positive conductor 695; motor 13 can now adjust the rudder of the craft.

All three possible circuits for energizing transfer relay 740 have now been interrupted, and the relay is therefore deenergized. Movable contact 742 of the transfer relay is disengaged from fixed contact 744 and engages fixed contact 743, energizing lamp 757 directly from positive conductor 692 through conductor 745, and lamp 757 shines steadily, indicating that the automatic pilot is fully engaged.

Movement of contact 790 of rudder engage relay 760 to energize the holding circuit for the relay is simultaneously effective to deenergize, at fixed contact 800, the circuit through conductor 803 to the caging and output relay windings, which become deenergized. Movable contact 653 of caging relay 651 is disengaged from fixed contact 655 and engages fixed contact 657; the uncaging winding of motor 35 is now energized through limit switch 658, contacts 657 and 653 of the caging relay, and conductor 698, from positive conductor 696, and motor 35 operates to uncage the directional gyroscope: deenergization of the motor in its fully uncaged position is caused by limit switch 658. Slider 121 of FIGURE 2 is now stabilized by the directional gyroscope.

When output relay 244 is deenergized, its contacts resume the positions shown in FIGURE 2: resistor 164 is now connected through conductor 283, contacts 252 and 253, of output relay 244, and conductors 284 and 285 to slider 266, which is centered and hence at ground potential, so that no change in the rudder control channel results from this operation of output relay 244. The input to amplifier 310 is grounded by contacts 255 and 256 of relay 244.

The automatic pilot is now in full control of the craft, because by reason of operation of the engage relays the centering motors 45, 46, and 47 have been disconnected, thus fixing the position of sliders 103 and 186 in FIGURE 2 and slider 354 (and index 436) in FIGURE 3. Change in the heading of the craft now results in displacement of slider 121 in FIGURE 2 in accordance with the magnitude of the change, and of slider 126 in accordance with the rate of change. Roll of the craft results in displacement of slider 107 of FIGURE 2 and slider 376 of FIGURE 3 in accordance with the amount of the roll, and of slider 114 of FIGURE 2 in accordance with its rate of change. Pitch of the craft results in displacement of slider 372 of FIGURE 3 in accordance with the magnitude of the pitch and of slider 360 in accordance with its rate of change. At the same time attack angle vane 44 is positioned in accordance with the actual attack angle of the craft, and sliders 231, FIGURE 2 and 384, FIGURE 3 are displaced along their windings, although still remaining on the metallized portions thereof.

Airspeed sensor 43 is also actuated to displace sliders 90, 172, and 190 upwardly along their windings as the airspeed of the craft increases. Voltage dividers 87 and 171 are so chosen with respect to fixed resistors 88 and 168, and their windings are so characterized, as to increase the output from the control surface displacement slider for a given displacement of the control surface in proportion to the reciprocal of the dynamic pressure, so that less actual displacement is required to give any particular rebalancing voltage.

Any unbalance in the elevator channel can be temporarily balanced by the voltage from slider 343, but cannot be permanently balanced thereby. This results from the nature of capacitor 350, which transmits no direct voltage, but which does transmit a voltage proportional to any change of the direct voltage. Motor 24 thus operates whenever the elevator channel is unbalanced, at a rate which is sufficient to produce across capacitor 350 a voltage sufficient to nullify, at summation terminal 332, the voltage causing the unbalance, such for example as that supplied by vertical gyroscope 32. The change in the attitude of the craft resulting from this motor operation of the elevators acts to decrease and ultimately to remove the signal, and the speed of motor 24 is similarly affected. This gives an integrating or reset type of operation to the elevator channel.

The function of pitch attitude indicator centering slider 416 is to compensate for any disparity between the ranges of movement of sliders 362 and 421. It was earlier pointed out that a more sensitive indication of pitch attitude is necessary in the present apparatus than that usually supplied by the gyro horizon of the aircraft, and this need is filled by indicator 61, in conjunction with vertical gyroscope 32, as follows:

Slider 372 of the vertical gyroscope is displaced from one end of its travel to the other for a change in pitch attitude of the craft from plus 75 degrees to minus 75 degrees. Slider 421 of indicator 61, on the other hand is displaced from one end of its travel to the other as index 435 moves along scale 437 from plus 25 degrees to minus 15 degrees. This means that each increment of movement of slider 421 along winding 420 must result in a voltage change of 150/40 times the voltage change resulting from the same incremental movement of slider 372 along its winding, the voltages being measured at summation terminal 412. This may be done by making summing resistor 415 larger than summing resistor 413 by a ratio of 15/4. The zero of pitch attitude on winding 374 is at its center, while zero pitch attitude on winding 420 is not at its center, but 2/5 the length of the winding from its lower end. This means that when index 435 reads zero a negative voltage whose magnitude is 1/8 that between terminals 8 and 9 appears on slider 421. A permanent correcting voltage of equivalent magnitude and of opposite polarity must be applied to the summation terminal to coordinate the two voltages, and this is accomplished by slider 416.

Aircraft have been encountered which require considerable left rudder to be held at low speeds and high powers to maintain straight flight, although at high speeds the rudder may be nearly streamlined. In order to maintain heading and roll attitudes during power changes at low speeds in such craft, low frequency integral control of the rudder may be added.

The normal stabilizing operation of the automatic pilot having now been described, it will next be necessary to describe the operation of the devices for changing the attitude so stabilized. These devices include pitch attitude adjuster 66, turn control 53, control stick 55, and coupler 57.

*Pitch Attitude Adjuster*

The operation of pitch attitude adjuster 66 will best be understood by reference to FIGURE 4: the purpose of this device is to cause a permanent change in the pitch attitude of the craft. It has already been explained that when elevator engage relay 453 is energized, motor 47 is cut off from the positive terminal of source 450, and hence slider 354 (and index 436) cannot move. If under these conditions adjuster 66 is pressed slightly downward, a new circuit is established from master switch 447 through conductors 464, 509, and 510, contacts 503 and 505 of adjuster 66, resistor 520, conductors 515 and 519, contacts 535 and 533 of relay 530, and conductor 516 to motor 47, the circuit being completed through resistor 479, conductors 488 and 484, and winding 485 of anti-engage relay 486. Motor 47 is thus energized to operate slider 354 and index 436. Movement of slider 354 changes the voltage supplied to summation terminal 332 through resistor 334, thus causing operation of servomotor 24 to adjust the elevators of the craft and simultaneously to supply a temporary voltage to summation terminal 332 from slider 343. Sliders 360 and 372 also supply voltages to summation terminal 332, and the apparatus continues to operate as long as adjuster 66 remains operated. When the desired new pitch attitude has been assumed, adjuster 66 is restored to its central position, operation of motor 47 ceases, and the elevator channel assumes a stable condition in the new pitch attitude.

If adjuster 66 is pressed still further down, resistor 520 is short circuited by contacts 505 and 507 and conductor 514, and motor 47 operates at a higher rate of speed.

If adjuster 66 is pressed upwardly instead of downwardly, a circuit is established from master switch 447 through conductors 464, 509, and 510, contacts 503 and 504 of adjuster 66, resistor 517, conductors 512 and 518, contacts 536 and 534 of relay 530, and conductor 513 to motor 47, the circuit being completed through resistor 492, conductors 488 and 484, and winding 485 of anti-engage relay 486. Motor 47 is now energized to operate slider 354 and index 436 in a direction opposite to that previously described, and at a low rate of speed. Pressing adjustor 66 still further upwardly short circuits resistor 517 by contacts 504 and 506 and conductor 511, and motor 47 operates at a higher rate of speed.

Turn Control

The purpose of turn control 53 is to change the attitude of the craft so that instead of flying in a straight line it follows a curve of a desired radius, the turn being properly coordinated. Movement of the turn control out of its central position first moves contact 682 (FIGURE 5) into engagement with one or the other of fixed contacts 684 and 685. This completes a circuit which may be traced from master switch 447 of FIGURE 5 through conductors 529, 559, and 553, contacts 551 and 552 of anti-engage relay 486, conductor 591, contacts 570 and 576 of go around relay 554, conductors 626 and 641, movable contact 564 of function selector 60 in its off position, conductor 660, contacts 597 and 601 of turn control relay 212, conductor 681, contacts 682 and 684 or 685 of turn control 53, and conductor 686 to winding 603 of control stick relay 243. It is apparent that this circuit is disabled if anti-engine relay 486 or turn control relay 212 or go around relay 554 is energized, or if function selector 60 is not in its off position.

Energization of relay 243 opens the circuit between contacts 210 and 211 of FIGURE 2, opens at contacts 605 and 607 the circuit to lamp 757 of FIGURE 5 through flasher relay contacts 754 and 755 and the circuit to master engage button 614, and closes a circuit which may be traced from master switch 447 through conductors 529, 559, and 553, contacts 551 and 552 of anti-engage relay 486, conductor 591, contacts 570 and 576 of go-around relay 54, conductors 626 and 641, movable contact 564 of function selector 60 in its off position, conductors 660 and 661, contacts 606 and 611 of turn control relay 243, and conductor 647 to winding 650 of caging relay 651 and winding 245 of output relay 244. These relays move into their energized positions previously described, the former caging the directional gyroscope and the latter having no present effect on the apparatus. At the same time control stick relay 243 interrupts at contacts 606 and 610 a circuit, presently to be traced, which supplies voltage to control stick 55.

Movement of turn control 53 also displaces slider 234, FIGURE 2, along winding 236 from center tap 237, and the voltage so produced is impressed on summation terminal 73 through contacts 241 and 242 of turn control relay 212, conductor 214, contacts 215 and 21 of localizer relay 216, conductor 226, the metallized portion of winding 227, slider 231, conductor 133, summing resistor 82, and conductors 136, 123, 116, and 111, and on summation terminal 153 through contacts 241 and 242 of turns control relay 212, conductor 214, contacts 215 and 221 of localizer relay 216, conductor 226, the metallized portion of winding 227, slider 231, conductor 133, the portion of winding 192 below slider 190, the slider, summing resistor 163, and conductors 174 and 173. Servo motors 19 and 13 run to adjust sliders 84 and 165 to rebalance these added signals in the aileron and rudder channels, and the craft begins to change heading. Change in heading has no effect on slider 121 because directional gyroscope 31 is caged, but the roll and yaw rate gyroscopes and the roll responsive portion of the vertical gyroscope supply signals to the rudder and aileron channels of the automatic pilot. As a result of all these signals, and those from sliders 84 and 165, the craft settles down in a continuous turn at a constant rate and a fixed bank angle. In this condition the turn control signal in the aileron channel is balanced by the roll attitude signal from the vertical gyroscope, appearing at slider 107, and the ailerons are in their normal, substantially streamlined condition. In the rudder channel the turn control signal is also balanced by the roll attitude signal, and the rudder is in its normal, substantially streamlined condition, the turn being continuous because the craft is banked.

When the heading of the craft has changed sufficiently, or when it is desired to discontinue a continuous circling movement, turn control 53 is returned to its central position. The rudder and aileron channels of the automatic pilot revert to their straight flight condition, and the control stick relay and hence the caging and localizer relays are deenergized. Normal automatic flight is therefore resumed.

Control Stick

Control stick 55 has three distinct functions, the first of which is the same as that of turn control 53. Movement of control stick 55 out of its central position about its roll axis first moves contact 664 in FIGURE 5 into engagement with one or the other of fixed contacts 672 and 673. This completes a circuit which may be traced from master switch 447 through conductors 529, 550, and 553, contacts 551 and 552 of anti-engage relay 486, conductor 591, contacts 570 and 576 of go around relay 554, conductors 626 and 641, movable contact 564 of function selector 60 in its off position, conductors 660 and 661, contacts 606 and 610 of control stick relay 243, conductor 662, contacts 664 and 672 or 673, and conductor 676 to winding 594 of turn control relay 212. It is apparent that this circuit is disabled if anti-engage relay 486, go around relay 554 or control stick relay 243 is energized, or if function selector 60 is not in its off position.

Energization of relay 212 opens the circuit between movable contacts 241 and 242 of FIGURE 2, opens at contacts 596 and 600 of FIGURE 5 the circuit to lamp 757 through flasher relay contacts 754 and 755, and the circuit to master engage button 614, and closes a circuit which may be traced from switch 447 through conductors 529, 550, and 553, contacts 551 and 552 of anti-engage relay 486, conductor 591, contacts 570 and 576 of go around relay 554, conductors 626 and 641, movable contact 564 of function selector 60 in its off position, conductor 660, contacts 597 and 602 of turn control relay 212, and conductors 646 and 647 to winding 650 of caging relay 651 and winding 245 of output relay 244. These relays move into their energized positions as perviously described, the former caging the directional gyroscope and the latter having no present effect on the apparatus. At the same time turn control relay 212 interrupts at contacts 597 and 601 circuit to turn control 53.

Further movement of control stick 55 displaces slider 203, FIGURE 2, along winding 205 from center tap 206, and the voltage so produced is impressed upon summation terminals 73 and 153 through conductor 207, contacts 210 and 211 of control stick relay 243, conductors 213 and 214, and the circuits traced in connection with turn control 53. The operation of the aileron and rudder control channels is just as these described.

When the heading of the craft has changed sufficiently, control stick 55 is returned to its central position by the human pilot, the rudder and aileron channels of the automatic pilot revert to their sraight flight condition, and the turn control relay and hence the caging and localizer relays are deenergized. Normal automatic flight is again resumed.

If the human pilot decides to make a landing of the craft using the automatic pilot instead of the normal manual control or the radio guidance control, it is desirable in the last instants before touchdown to change the heading of the craft to take out the crab angle which it must have in the presence of cross wind, so that the craft will be heading in the direction in which it is moving when the wheels touch. This procedure results in smoother, safer landings and less injury to the landing gear. The craft must not be banked, however, so that a skidding turn is required.

To accomplish this, control stick 55 may be manually twisted about its own axis: this actuates slider 193 of FIGURE 2 through mechanical connection 196, and slider 193 is connected to summation terminal 153 through summing resistor 156 and conductors 177, 176, 175, 174, and 173. By this means an additional voltage can be impressed on summation terminal 153 for energizing motor 13 to displace the rudder of the craft only, thus causing a skidding turn.

Control stick 55 is also effective to change the pitch attitude of the craft as long as this stick is displaced. This is shown in FIGURE 3, where stick 55 is shown to actuate slider 365 through a mechanical connection 364. Slider 365 is connected to summation terminal 332 through summing resistor 336 and conductors 368, 363, and 356. Its effect in the elevator channel is in every sense like the effect of slider 193 in the rudder channel just described, and this will not be repeated.

While the control stick is manipulated to perform either of the two functions just described, the previously described circuit for caging relay 651 and output relay 246 is completed by operation of turn control relay 212. This is acomplished by movable contact 663 or movable contact 665, which are actuated into engagement with one or the other of their respective fixed contacts as the stick is manipulated about its yaw and pitch axes.

*Stall Prevention*

If while proceeding in automatic flight the human pilot inadvertently operates selector 66 to select a pitch attitude requiring more power than the engines are adjusted to deliver, or if one of a number of engines fails, the craft may approach a condition of stall. If this happens when the craft is in level flight, a down elevator adjustment of the automatic pilot must be made. If it happens when the craft is banking, the angle of bank must be reduced as well. These two functions are performed by attack angle vane 44, as follows.

As shown in FIGURE 4, vane 44 actuates switch 540 through mechanical connection 383. This completes a circuit from master switch 447 through conductors 464, 509, and 544 and switch 540 to the winding 531 of relay 530. The relay operates, disabling at contacts 534 and 536 the up elevator function of selector 66, and at contacts 533 and 535 the down elevator function of the selector 66. In addition, a circuit is completed from conductor 509, previously shown positive, through switch 1202, a resistor 539 and contacts 537 and 533 of the relay to conductor 516. Pitch attitude selector motor 47 is thereby energized to operate continuously, in a sense to decrease the selected pitch angle and hence lower the nose of the craft, as long as vane 44 maintains switch 540 closed by reason of excessive attack angle.

This stall prevent arrangement is positive in function and makes it impossible to use selector 66 so as to stall the craft. Stalling conditions may none the less arise for other reasons: it may be that although the attack angle may be only silghtly in excess of the danger value its rate of increase is large, and the normal rate of correction by selector motor 47 is not sufficient to quickly correct the attitude of the craft to overcome this. Further stall prevention means independent of selector motor 47 are accordingly provided.

As shown in FIGURE 3, vane 44 actuates slider 384, which is connected to summation terminal 332 through resistance capacitance network 390, summing resistor 339, and conductors 382, 375, 368, 363, and 356. As long as the attack angle of the craft remains within a selected range, slider 384 remains on the metallized portion 387 of winding 386, and no voltage is impressed on summing resistor 339, but if the attack angle becomes excessive, slider 384 is moved onto the resistance portion of the winding, and a voltage is impressed on summation terminal 332 which increases with further displacement of slider 384, and which is in a sense to cause motor 24 to give down elevator. Network 390 is included here so that not only the actual amount of excess attack angle but also its rate of change may be applied to the amplifier, to give more immediate correction of such changes in attack angle. When the attack angle returns within the selected range of values, slider 384 is moved back on the metallized portion 387 of its winding, and the elevator channel is restored to its former condition.

Network 390 may be functionally described as a differential voltage divider. Any constant component of the voltage appearing between slider 384 and ground "sees" a voltage divider made up of resistors 391 and 392 in series, since capacitor 393 in parallel with resistor 391 is of infinite resistance to constant applied voltages. Any variable component of the voltage between slider 384 and ground "sees" a voltage divider in which resistor 391 is shunted by a capacitive impedance which becomes increasingly small as the rate of variation increases: this tends to increase the potential of the common terminal of the network, in proportion to the total applied voltage, as the rate of change of the voltage increases. By selecting suitable values for resistors 391 and 392 and capacitor 393, the relative effects of the constant and variable components of the voltage from slider 384 to ground may be given any desired value.

As shown in FIGURE 2, vane 44 actuates slider 231 which is connected to summation terminals 73 and 153 through circuits previously traced. This slider moves along winding 227, across which the turn control and control stick voltages are impressed. As long as the attack angle is within the selected limits, slider 231 is on the metallized portion 233 of winding 227, and the full voltage across the winding is transmitted to conductor 133. If the attack angle exceeds the limit, however, slider 231 moves on to the resistance portion of the winding, and the turn control or control stick voltage is fractionated, the portion applied to conductor 133 becoming smaller as the attack angle increases, thus reducing the signal on summation terminals 73 and 153: the bank angle of the craft is accordingly reduced. When the attack angle returns within the desired range, slider 231 is moved back on to the metallized part of its winding, and full turn control or control stick voltage is again supplied to the summation terminals.

The foregoing operation of the craft depends upon proper selection of summing resistors etc. to give the various control members suitable amounts of relative effect on the amplifiers.

*Automatic Landing*

There remains for explanation the operation of the radio control for automatically maintaining the craft on a desired instrument landing beam or localizer path. This apparatus includes localizer receiver 56 which is a component of the airborne portion of the well known Instrument Landing System, described in Technical Development Reports numbers 35 and 55 of the Civil Aeronautics Authority published in October 1943, and June 1947, respectively. Receiver 56 supplies at output conductors 290 and 291 of FIGURE 2 a unidirectional voltage which varies in magnitude and reverses in polarity with variation in the amount and reversal of the sense of the departure of the craft from a path established in space by the mode of transmission of the blind landing signals. Whether a given sense of signal means that the craft is to the left or the right of the path depends on whether the craft is approaching or departing from the transmitter.

The signal from receiver 56 is to be applied to the coupler 57, whose input terminals are normally short circuited by contacts 223 and 224 of localizer relay 216. Under these conditions a motor comprised in the coupler drives slider 226 to its central position on winding 270 through mechanical connections 269 and 268, as previously pointed out, and simultaneously drives slider 304 to a central position on winding 302 through mechanical connections 269 and 298. Thus receiver 56 and coupler 57 may be turned on and warmed up without having any effect on the automatic pilot.

When it is desired to make an automatic landing, the human pilot brings the craft into an area served by an ILS transmitter, and preferably approaches the localizer beam at an acute angle. The beam may be followed either toward or away from the transmitter. Assuming first that it is desired to fly away from the transmitter, function selector 60 is moved to its out position.

Switching contact 561 of function selector 60 energizes the winding 275 of reverse relay 274, as shown in FIGURE 5. Switching contact 562 deenergizes the circuit from conductor 612 energizing master engage button 614 and providing intermittent illumination of lamp 757, and energizes winding 217 of localizer relay 216. Switching contact 563 energizes conductor 635, but since switch 631 is open, this produces no change in the circuit. Switching contact 564 deenergizes the circuit from conductor 660 energizing the turn control and control stick switches, so that both of these devices are disabled whenever radio control is in operation, and completes a circuit through conductors 642 and 644, contacts 632 and 633 of precession relay 325, and conductors 645, 646, and 647 to the windings of output relay 244 and caging relay 651.

Reverse relay 274 displaces movable contacts 271, 272, 290, and 291 upwardly as shown in FIGURE 2, establishing a reverse polarity for the voltage across winding 270 and a reverse phase for the voltage across winding 302. Caging relay 651 cages directional gyroscope 31 as previously described. Localizer relay 216 interrupts at contacts 221 and 215 the circuit from conductor 214 to summation terminals 73 and 153 and unshorts the input to coupler 57, supplying thereto the output from receiver 56, at contacts 223, 224, and 225, so that slider 266 is driven by the coupler to supply a signal determined by the ILS receiver. Output relay 244 disconnects resistor 164 from slider 266 at contacts 252 and 253, and grounds the resistor through contacts 252 and 254 and conductor 282. Relays 216 and 244 cooperate to complete a new circuit from slider 266 through conductors 285 and 286, contacts 251 and 247, conductor 248, contacts 222 and 221, conductor 226, and the portion of winding 227 to the left of slider 231 to the slider, and thence by circuits already traced to the aileron and rudder channels of the automatic pilot to control the heading of the craft in the same fashion as the turn control signal described above. Attack angle vane 44 has the same bank stall prevention action of the radio responsive signal as it does on the turn control signal.

Operation of output relay 245 performs a further function in displacing movable contact 255 out of engagement with fixed contact 256, where it short circuits the input to amplifier 310, and into engagement with fixed contact 257: this completes the input circuit to amplifier 310 from slider 307 of voltage divider 306. The slider is manually set with respect to winding 305, the latter being energized from slider 304. Coupler 57 has displaced slider 304 from its central position simultaneously with slider 266, so that the voltage on slider 304 is determined in phase and amplitude by the sense and amount of departure of the craft from the center of the beam. Voltage divider 306 makes it possible to vary the relative proportions of the voltages supplied to amplifier 310 and to amplifiers 15 and 21, for a given displacement of sliders 304 and 266.

The voltage applied to amplifier 310 results in an output voltage of the same phase and proportional amplitude, and the output voltage energizes the amplifier phase winding of precession motor 34 through transformer 312, quadrature capacitor 315, and conductor 318. The line phase winding of the motor is not energized at this time, however, because relay 324 is not energized, so that no operation of the motor results.

In the radio control of the craft thus far described, gyroscopic stabilization is dispensed with and the directional gyroscope is caged, heading control of the craft being solely from the radio. This arrangement has disadvantages since it responds only ot physical departure of the craft from the desired path, not to the changes in heading which normally precede the displacement. On the other hand, normal gyroscopic control cannot be maintained because the gyroscope immediately nullifies any correction initiated by the radio control. This can be overcome by leaving the directional gyroscope uncaged, but precessing it, whenever a radio signal is changing the heading of the craft, at a rate comparable to the rate at which the heading of the craft is changed by the radio control, the direction of precession being opposed ot that which the gyroscope would otherwise impart to slider 121.

If precession of the gyroscope is desired, the human pilot presses gyro button 631 of FIGURE 5, which is possible when function selector 60 is in its out and in positions: button 631 remains in contact making position thereafter until the function selector is turned to off. A circuit is now completed from switching contact 563 of function selector 60, previously shown to be positive, through conductors 635 and 636, button 631, and conductors 640 and 639, to precession relay 325, which is accordingly actuated to complete at contacts 323 and 324 (FIGURE 2), the circuit from secondary winding 320 of transformer 321 through conductor 319 to the line phase winding of precession motor 34, and the motor begins to operate. Relay 325 also interrupts, at contacts 632 and 633 (FIGURE 5) the circuit to caging relay 651 and output relay 244 previously traced. The directional gyroscope is uncaged. Fixed contact 222 of localizer relay 216 of FIGURE 2 is now connected through conductor 248 and contacts 247 and 250 of output relay 244, to slider 261 of voltage divider 262 which is connected to slider 266 through dropping resistor 265: the voltage for the aileron and rudder channels is accordingly reduced.

The voltage at slider 266 is simultaneously supplied, to summation terminal 153 only, through conductors 285 and 284, contacts 253 and 252 of output relay 244, conductor 283, resistor 164, and conductors 176, 175, 174, and 173.

Slider 121 is now being displaced with respect to winding 120 in one sense by precession of the gyroscope, and the winding is being displaced with respect to the slider in the opposite sense by turn of the craft resulting from the voltages supplied to summation terminals 73 and 153. If the rate at which precession motor 34 operates to adjust slider 121 is the same as that at which the craft is turning, the slider stays in its central position and the radio signals from slider 231 are balanced by signals from sliders 107 and 126. At the same time erratic heading changes, due to buffeting winds for example, may still be corrected for by the directional gyroscope.

The significance of resistor 164 and its connections will now be explained. For normal manual control of the craft by turn control 53 or control stick 55 voltages are supplied to the aileron and rudder amplifiers through summing resistor 82 and through voltage divider 191, 189 and summing resistor 163, respectively, and the values of these components must be selected with this in mind to give a coordinated turn. During such turns the directional gyroscope is caged so that no signals are supplied through summing resistors 80 and 160.

In normal radio control voltages are supplied to the aileron and rudder amplifiers through the same resistors, and through contacts 221 and 222, conductor 248, contacts 247 and 251, and conductor 286, from voltage divider 267. The values of resistors 82, 191, 181, and 163 are still suitable to give coordinated turns of the craft, and the directional gyroscope signals are still zero.

However, in radio control with directional gyroscope precision, while the radio signals (derived this time from slider 261 rather than slider 266) are still in the proper proportion to give a coordinated turn, there are additional signals in the aileron and rudder amplifiers through resistors 80 and 160 from the directional gyroscope. In normal craft-stabilizing operation these voltages are proportioned to also give heading correction by coordinated turns. When the radio signal is used not only to adjust the automatic pilot directly but also to precess the directional gyroscope, on the other hand, it is found that in some aircraft coordinated turns do not take place. In such a case an additional signal of appropriate magnitude from the radio controlled slider 266, must be added in the appropriate channel: this is accomplished by resistor 164 shown in FIGURE 2 as adding a signal in the rudder channel. It will be appreciated that FIGURE 2 is presented by way of illustration, and that resistor 164 may be arranged to supply voltage to the aileron channel alone instead of to the rudder channel alone, if the situation is such as to require it.

Suppose once again that the craft is in automatic flight. This condition is regained by moving function selector once more to off, which mechanically operates button 631 (FIGURE 5) to interrupt the gyro precession circuits. Suppose also that it is now desired to fly along an ILS beam toward the transmitter. The human pilot turns function selector 60 to its in position, in which movable contacts 562, 563, and 564 perform the same function that they perform in the out position of the function selector. Switching contact 561 does not energize reversing relay 274 in this position of the function selector, and the polarity and phase of the voltages on windings 270 and 302 (FIGURE 2) respectively are therefore normal or opposite in sense to those prevailing when the function selector is in its out position. A radio signal which under the former condition would result in a turn of the craft to the left now results in a turn of the craft to the right, which is the effect desired. Precession of the gyroscope is also available in this position of the function selector, by operation of gyro button 631.

When the localizer beam has been followed to its intersection with the vertical guidance path or glide path, the human pilot moves function selector 60 into its glide position. Switching contact 564 interrupts the energization of caging relay 651 and output relay 244, switching contact 563 automatically energizes precession relay 327 through conductors 630 and 639, and switching contact 562 produces no change in the circuit. Gyro button 631 is mechanically depressed when function selector 60 is in its glide position, since the position of this button is used by the human pilot as a visual indication of whether or not the directional gyroscope is being precessed, which is the case during the glide of the craft.

Switching contact 561 is effective in the glide position of function selector 60 to complete a circuit from master switch 531 through conductors 529, 550, and 553, contacts 551 and 552 of antiengage relay 486, conductor 581, switching contact 561, conductor 583, and contacts 567 and 575 of go around relay 554 to glide relay 274, which functions to control the vertical movement of the craft so that it follows the glide path. The operation of this relay is shown in my copending attack angle control application referred to above.

Go-Around Operation

The automatic pilot contemplated herein is to be used not only for landings at conventional airports, but also for landings on aircraft carriers, where it is common for a wave-off to be given when a landing is nearly completed. Under such conditions the craft is at a very low altitude and is very near a stall condition: it is vitally important therefore that full control of the craft be restored to the human pilot with a minimum of delay and uncertainty. For this purpose I have provided go around relay 554 and go around button 586. Go around relay 554 is energized from switching contact 561 of the function selector in its glide position through conductor 585, go around button 586, and conductor 587, the circuit being completed through ground connection 588. It is at once apparent that go around relay 554 can be energized by go around button 586 only when antiengage relay 486 is deenergized and when function selector 60 is in its glide position.

Operation of go around relay 554 displaces movable contact 567 out of engagement with fixed contact 575, thus deenergizing glide relay 584, and into engagement with fixed contact 572, thus completing a holding circuit for the go around relay from switching contact 561 of function selector 60 through conductor 583, contacts 567 and 572, conductor 590. Subsequent release of button 586 does not result therefore in the return of relay 554 to its deenergized condition.

Operation of relay 554 displaces movable contact 570 into engagement with fixed contact 573, energizing a go around lamp 690, and out of engagement with fixed contact 576. This deenergizes switching contact 562 and hence localizer relay 216, so that control stick and turn control voltages rather than radio control voltages are effective to control the craft's heading; it also deenergizes switching contacts 563 and 564 and hence precession relay 325, output relay 244, and caging relay 651.

Operation of relay 554 displaces movable contact 571 into engagement with fixed contact 574, thus completing a circuit from anti-engage relay 486 through conductors 591 and 599, contacts 571 and 574, and conductor 691 to the movable contact 597 of turn control relay 212 and to movable contact 606 of control stick relay 243, the latter through conductor 661. These are the mutual disabling circuits for the turn control and control stick, and are made operative independently of switching contact 564 of function selector 60.

Go around button 586 may be physically of small dimensions, and may be mounted in the control stick itself, so that no arm movement is required of the human pilot to regain control of the craft through the control stick, as would be the case if he were required to return the function selector to its off position. Merely pushing a button already at hand also requires less conscious attention than adjusting an index to one of a number of positions, so that the human pilot may direct his attention principally to the actual piloting of the craft.

When the craft has gained altitude and air speed and is in a relatively safe condition, the human pilot can return function selector 60 to its off position, releasing go around relay 554 and reestablishing normal automatic flight of the craft.

Altitude Stabilization

While the automatic pilot thus far described is a considerable advance over previous arrangements, the modification shown in FIGURE 7 is a still greater improvement, as it includes means for stabilizing the altitude of the craft as well as its attitude. FIGURE 7 should be considered as matter in addition to FIGURE 5, and only those portions of FIGURE 5 necessary to explain the altitude stabilizing apparatus are shown in FIGURE 7. A single change in the structure of FIGURE 5 is made: contacts 674 and 675 of control stick 55 are disconnected from conductor 676 and are connected to a common conductor 1100.

When master switch 447 is closed, antiengage relay 486 is operated as previously described in connection with FIGURE 4. Inverter 52 is also energized as previously described, and in turn supplies alternating voltage through conductors 1101, 1102, 1103 and 1104, contacts 913 and 911 of relay 906, and conductors 1105, 1106, and 1107 to amplifier 962, and, through conductor 1108, to the primary winding of velocity generator 973. Primary winding 956 of transformer 955 is also energized with alternating voltage from terminal 549, and energizes the capacitors of altitude responsive member 941. An input is accordingly supplied to amplifier 962, motor 961 is energized, and pinion 953 adjusts rack 952 so that the tension in spring 951 is changed, to center plate 946 with respect to plates 947 and 950: at the same time contact 980 is spring centered between segments 981 and 982. No voltage with respect to ground is upon slider 975 since it is spring centered. A voltage appears between slider 987 and ground which is determined by the displacement of the slider from its central position, and a portion of this voltage determined by the setting of slider 991 is supplied through summing resistor 1027 to summation terminal 332 of the elevator channel amplifier FIGURE 3, and affects the setting of slider 354, and the indication of index 436, at which the elevator channel becomes balanced.

A circuit may be traced from master switch 447, FIGURE 7, through conductors 529, 550, 692 693, and 1111, contacts 1024 and 1022 of relay 1011, conductor 1112, contacts 1014 and 1016 of relay 1010, conductors 1113 and 1114, winding 996 of reset motor 994, and conductor 1115 to ground connection 1116. By this circuit dynamic braking of motor 994 is provided.

A circuit may also be traced from master switch 447 through conductors 529, 550, and 1121, contacts 935 and 936 of relay 932, conductors 1122 and 1123, winding 926 of altitude clutch relay 925, and conductor 1124 to ground connection 1116. Relay 925 is accordingly energized, displacing movable contact 930 into engagement with fixed contact 931.

A circuit from conductor 1122, just shown to be positive, also extends through conductor 1126, movable contact 922, fixed contact 923, and conductor 1127 to movable contact 1005. If this contact happens to be midway between contact segments 1006 and 1007, the circuit is interrupted.

If contact 1005 is in engagement with contact segment 1006, the circuit is continued through winding 1012 of relay 1010 to ground connection 1130: relay 1010 is energized, and the D.C. braking circuit for reset motor 994 just traced is interrupted at contacts 1014 and 1016. At the same time an A.C. circuit for reset motor 994 is completed from conductor 1105 through conductors 1132 and 1133, and contacts 1017 and 1015 of relay 1010, to conductor 1134, and thence by conductor 1135 and winding 997 or by capacitor 1000, conductors 1136 and 1114 and winding 996, to conductor 1115 and ground connection 1116. Motor 994 is accordingly energized, and operates in a direction to move contact 1005 out of engagement with contact segment 1006 and to center slider 987. The movement of the slider changes the voltage supplied to the elevator channel amplifier through summing resistor 1027, requiring operation of centering or selector motor 47 to rebalance the channel and hence energizing antiengage relay 486. Eventually, by operation of the reset motor, slider 987 and contact 1005 are centered. Relay 1010 then remains deenergized, the A.C. energization of motor 994 is interrupted, and the D.C. braking of the motor is restored.

If contact 1005 is in engagement with contact segment 1007 when relay 925 is energized, on the other hand, the circuit to contact 1005 is continued through winding 1020 of relay 1011 to ground connection 1130. Relay 1011 operates, interrupting the D.C. braking circuit for reset motor 994 at contacts 1024 and 1022, and completing an A.C. energizing circuit which may be traced from conductor 1132 previously identified through conductor 1137, and contacts 1025 and 1023 of relay 1011 to conductor 1140, and thence by conductors 1136 and 1114 and winding 996 of reset motor 994, or by capacitor 1000, conductor 1135, and winding 997 of the reset motor, to connector 1115 and ground connection 1106. Motor 994 is accordingly energized in the opposite sense to that previously described, and operates in a direction to move contact 1005 out of engagement with contact segment 1007, and to center slider 987, as before. The operation of the elevator channel of the automatic pilot previously described takes place again, but in the opposite sense.

As a result of the operations described in the two preceding paragraphs, the apparatus comes to a condition in which sliders 975 and 987 and contacts 980 and 1005 are all centered, reset motor 994 is dynamically braked and all relays are as shown in the figure: no voltage from the altitude control apparatus is then effective in the elevator channel of the automatic pilot, which assumes the same preparatory condition as though no altitude control apparatus were included.

The automatic pilot may now be engaged as described previously. This results in fixed contact 725 of elevator engage relay 453 being connected to the master switch, and altitude control switch 900 may now be closed at any time to set the altitude control apparatus into operation.

When switch 900 is closed, a circuit is completed from fixed contact 727 of the elevator engage relay through conductors 732, 739, and 1150, contacts 904 and 902 of switch 900, conductors 1151 and 1152, contacts 931 and 930 of relay 925, and conductor 1153 to clutch 974 which is accordingly energized, mechanically connecting slider 975 to motor 961. From conductor 1151 a circuit may also be traced through winding 921 of relay 917 and conductors 1154 and 1124 to ground connection 1116. Relay 917 is accordingly actuated, cutting off the unidirectional voltage from movable contact 1005 and supplying it instead to movable contact 980 through conductor 1155.

The altitude control apparatus is now in operation. If any change in altitude takes place, it is sensed by member 941 and amplifier 962 is unbalanced to cause operation of motor 961, which displaces rack 952 to restore the force balance, and at the same time drives slider 975 through clutch 974 away from its central position. The latter effect supplies a voltage through summing resistor 1026 to the elevator channel of the automatic pilot. This channel being previously balanced, the voltage applied through summing resistor 1026 unbalances the channel and amplifier 26 (FIGURE 3) is energized to cause operation of motor 24 sufficient to displace slider 343 at such a rate that the voltage applied to summation terminal 332 through summing resistor 333 equals and opposes that applied through summing resistor 1026. The resulting change in elevator position causes the pitch attitude of the craft to change, and the voltage on slider 372 changes similarly. The elevator channel settles down in a stable condition in which slider 343 is again stationary and in which the voltage from the altitude control apparatus is neutralized by an equal and opposite voltage determined by vertical gyroscope 32, and the craft continues in flight at a new pitch attitude, resulting in change in the rate of climb of the craft which restores it to the desired altitude. As this occurs reverse action of the over-all apparatus occurs, until the original condition of the apparatus is again reached if the change in altitude initiating operation of the apparatus was temporary.

Temporary or transient changes in the apparatus are primarily due to gusts, movement of personnel within the craft, etc. Permanent changes in the aircraft also occur: examples of such changes are consumption of fuel which shifts the center of gravity of the craft, pitch mistrim of craft, etc. The apparatus as so far explained cannot compensate for permanent changes, but further apparatus is provided as follows for making this compensation.

The response of member 941 to change in altitude also results in displacement of contact 980 by motor 961 into engagement with one or the other of contact segments 981 and 982. This energizes relay 1010, through conductor 1156, or relay 1011, through conductor 1157, and reset motor 974 begins to operate, changing the position of slider 987, and thus changing the voltage supplied to the elevator channel through summing resistor 1027. The direction of motion is such that the voltage supplied on slider 987 is of the same polarity as that supplied on slider 975, but motor 994 operates slider 987 through a much greater gear reduction than that between slider 975 and motor 961 so that the voltage on slider 987 changes only very slowly.

Motor 961 reverses when the altitude change is arrested, and slider 975 is restored to its central position when the craft has returned to the desired altitude. Motor 994, however, does not reverse when motor 961 reverses: as long as contact 980 engages one of its fixed contacts motor 994 continues to run in one direction at a fixed speed. If the craft is properly trimmed about its pitch axis, changes in altitude normally occur in random senses, and over an appreciable interval the craft is below the desired altitude as much of the time as it is above it, so that slider 975 never remains appreciably displaced from the center of winding 976. However, if the craft is mistrimmed, or if the flight continues over a long period so that the loss of weight represented by the fuel consumed is significant, the craft tends to depart from the desired altitude in one particular direction more than the other, and motor 994 runs more in one direction than the other. This brings about a permanent displacement of slider 987 from the center of winding 988, and a continuous signal is supplied to the elevator channel, maintaining the elevator slightly displaced to correct to the mistrim or fuel consumption.

It will at once be obvious that when it is desired to change the altitude of the craft, the altitude control apparatus must be disabled. Such disabling may be temporary, as when the human pilot merely wishes to fly at a different altitude, or it may be permanent, as when it is contemplated to land by following the ILS glide path. In either case it is not only convenient but highly desirable that manual operation of the control member, either control stick 55 or function selector 60, shall automatically perform the disabling function, thus relieving the human pilot of the need for remembering to turn off the altitude control apparatus before initiating the altitude change. Moreover, it is advantageous, in any intentional change in altitude, to have the sensing unit 941 continue in operation so that it is at all times balanced: when this is done the altitude control apparatus can resume control of the craft when the desired new altitude is reached, with a minimum amount of transient erratic control. This is accomplished as follows.

When control stick 55 is manually displaced in a fore-and-aft direction, movable contact 665 in FIGURE 7 is brought into engagement with one of fixed contacts 674 and 675, completing a circuit which may be traced from master switch 447 through conductors 529, 550, and 553, contacts 551 and 552 of the antiengage relay 486, conductor 591, contacts 570 and 576 of go around relay 554, conductors 626 and 641, switching contact 564 of function selector 60, conductors 660 and 661, contacts 606 and 610 of control stick relay 243, conductor 662, contact 665 and contact 674 or 675, and conductor 1100 to winding 933 and contact 937 of relay 932. The relay operates, completing the circuit from contact 937 through contact 940 and conductor 1160 to winding 594 of turn control relay 212, which operates to perform the functions described heretofore.

Operation of relay 932 also interrupts at contacts 935 and 936 the circuit previously traced through conductor 1122 to winding 926 of relay 925 and to contact 922 of relay 917. Relay 925 is deenergized, opening at contacts 931 and 930 the energizing circuit for clutch 974, which is also deenergized, freeing slider 975 from motor 961, so that it can be centered by springs 978 and 979. The normal operation of the apparatus is such that slider 975 is never very far from the center of its winding and any sudden unbalance signal supplied when the centering springs operate is masked by the larger voltage produced on slider 361 by operation of the control stick.

Deenergization of contact 922 of relay 917 deenergizes movable contact 980 without energizing movable contact 1005. Relays 1010 and 1011 are both deenergized: this stops reset motor 994 and applies the braking voltage thereto: slider 987 remains where it was set. This arrangement is particularly desirable, because the trim of the craft about its pitch axis is the same at the new altitude as it was at the old altitude, and stabilization at the new altitude takes place more quickly if the reset signal is maintained at its former value.

When the new altitude is reached, the control stick is returned to its neutral position. The energizing circuit for relay 932 is broken at control stick contact 665, and normal operation of the altitude control apparatus at the new altitude is initiated.

When a craft begins to follow the glide path, it is at the end of its flight, and the altitude control apparatus will not ordinarily be needed again. Displacement of switching contact 561 of function selector 60 into its glide position completes a circuit which may be traced from master switch 447 through conductors 529, 550, and 553, contacts 551 and 552 of antiengage relay 486, conductor 581, movable contact 561, conductors 585 and 1160, contacts 912 and 914 of relay 906, conductors 1161 and 1162, contacts 901 and 903 of switch 900 and winding 907 of relay 906 to ground connection 1163. Relay 906 operates, interrupting at contacts 911 and 913 the supply of alternating voltage to the entire altitude control apparatus.

Contact 915 of relay 906 engages contact 916 before contact 912 disengages contact 914, and an energizing circuit for relay 906 is then completed from contact 727 of elevator engage relay 453 through conductors 732, 739, 1150, and 1164, contacts 915 and 916 of relay 906, conductor 1162, contacts 901 and 903 of switch 900 and winding 907 of relay 906 to ground connection 1163. The alternating voltage energization of the altitude control apparatus thus remains cut off at contacts 911 and 913 of relay 906, even after function selector 60 is moved out of its glide position, and can be restored only by turning switch 900 to its off position and then to its on position once more.

It should be emphasized that if, after the altitude control apparatus is put into operation, switch 900 is thrown off, slider 975 and contact 980 are quickly centered by springs 978 and 979, and slider 987 and contact 1005 are slowly centered by motor 984. On the other hand, if control stick 55 is operated about its pitch axis, slider 975 and contact 980 are centered as before, but slider 987 and contact 1005 remain where they happen to be, and if function selector 60 is moved into its glide position, both sliders and both contacts remain where they happen to be. This last result is provided because in the last stages of an automatic landing the craft is very near the ground, and any signal to the elevator channel resulting from centering of either of the sliders would cause elevator operation when it is particularly necessary that this operation result solely from the radio control.

A final feature of the invention is illustrated in FIGURE 1, where an acceleration limiter 1198 is shown as supplying an input to elevator network 27 through a suitable conection 1199. Limiter 1198 may comprise a linear accelerometer mounted in the craft to respond to acceleration thereof in a vertical direction. Whenever the craft has a vertical acceleration exceeding a selected absolute value, which may be zero if desired, the accelerometer supplies to the elevator network a voltage of such a polarity as to change the position of the elevators so as to decrease the vertical acceleration. By this means the human pilot and the automatic pilot alike are prevented from causing such operation of the craft as is likely to endanger its safety by reason of excessive structural strains in pulling out of dives, for example.

The special features of my automatic pilot may be briefly summarized as follows. A visual indication is provided to show when the automatic pilot is in condition to be engaged. The automatic pilot cannot be engaged if any channel of the automatic pilot is not balanced, or if the turn control or the control stick is not in its central position, or if the function selector is not in its off position. No channel of the automatic pilot can be engaged individually. It is impossible to energize the precessing motor of the directional gyroscope without also uncaging the gyroscope, and it is also impossible to operate either the turn control or the control stick without caging the directional gyroscope. The gyroscope button cannot be operated or left in its operated position to precess the directional gyroscope when the function selector is in its off position, but precession of the gyroscope automatically occurs in the glide position of the function selector. If the human pilot inadvertently operates the throttle of the craft so that its attack angle becomes dangerously high, or if this occurs for any other reason, automatic adjustment is made of the elevator settings if the craft is in straight flight and of the rudder and aileron settings as well if the craft is turning. Means are provided for causing the craft to fly at a constant altitude, and are disabled automatically when the control stick is operated about its pitch axis, or when the function selector is moved to its glide position, the disabling being temporary in the former case and permanent in the latter case so that the altitude control apparatus must be shut off and turned on again to reestablish altitude control, and this being possible only when the function selector is moved out of its glide position. Acceleration responsive means are also provided to change the pitch attitude of the craft in a proper sense to reduce the acceleration in question.

From the foregoing specification it will be apparent that the automatic pilot embodies means varying the attitude of a craft, stabilized by gyroscopic means, at the will of the human pilot. These means include turn control 53 and control stick 55, which are mutually disabling, and coupler 57 including function selector 60, which disables both the first two controls. The effectiveness of these controls is varied in accordance with air speed by air speed responsive means 47, and its connections to sliders 90, 190, and 172, the second of these being effective in the rudder channel but not in the aileron channel. Resistor 164 is provided to adjust for any difference between the aileron-to-rudder ratio of the directional gyroscope and that of the turn control when both are used at once by precessing the directional gyroscope in automatic landings. The apparatus is based on parallel summing of direct voltages, so that as shown in the elevator circuit the characteristics of certain of these voltages may be modified by the use of resistance-capacitance networks to give a differentiating or integrating effect on the appartus as a whole. A novel pitch attitude adjuster is also described which is operative whether the automatic pilot is engaged or not, and altitude control apparatus is combined with the other apparatus in a novel fashion.

Numerous objects and advantages of my invention have been set forth in the foregoing description, together with details of the structure and function of the invention, and the novel features thereof are pointed out in the appended claims. The disclosure, however, is illustrative only, and I may make changes in detail, especially in matters of shape, size, and arrangement of parts, within the principle of the invention, to the full extent indicated by the broad general means of the terms in which the appended claims are expressed.

I claim as my invention:

1. An automatic pilot comprising, in combination: motive means for changing the heading of a craft in accordance with the magnitude and sense of the direct voltage appearing at a summing terminal; a directional gyroscope supplying a first direct voltage which varies in sense and magnitude with variation in the deviation of the craft from a desired heading; a yaw rate gyroscope supplying a second direct voltage which varies in sense and magnitude with variation in the rate of change of the heading of the craft; means connecting said directional gyroscope to said summing terminal for normally energizing said summing terminal with said first voltage; means having the characteristic of transmitting the changing component but not the constant component of a varying direct voltage; and means connecting the last named means to said rate gyroscope and to said summing terminal, for preventing any constant component of said second named voltage from reaching said summing terminal.

2. An automatic pilot for movable craft comprising, in combination: means responsive to the magnitude of any departure of the craft from a selected attitude; means responsive to the rate of any such departure; means for actuating a craft control member to return the craft to the selected attitude; means normally causing operation of said actuating means in accordance with the responses of said responsive means; and means preventing said actuating means from being influenced by any constant component of the response of said second responsive means.

3. An automatic pilot comprising, in combination: motive means for operating the ailerons and rudder of a craft in accordance with the magnitude and sense of voltage applied thereto; gyroscopic means supplying to said motive means a first pair of voltages determined by the amount and sense of the departure of the craft from a desired heading; a blind landing instrument having a first operative condition, in which it supplies a first steering output, and a second operating condition in which it supplies a second steering output, and a precessing output; control means connected to said motive means and said blind landing instrument, and supplying to said motive means a second pair of voltages determined by the steering output of said blind landing instrument; means rendering said gyroscopic means inoperative in said first condition of said blind landing instrument and operative in the second condition thereof; and means independently supplying to one of said motive means a voltage determined by said second steering output.

4. An automatic pilot comprising, in combination: a control network having rudder and aileron channels; gain adjusting means in at least one of said channels; adjustable means energizing said channels, in a desired ratio, in accordance with change to be made in the control of a craft; air speed responsive means; and means adjustng both the energizing means and the gain adjusting means of said one of said channels in accordance with the response of said air speed responsive means.

5. Apparatus of the class described comprising, in combination: means for controlling the direction of movement of a dirigible craft in accordance with the magnitude and polarity of a unidirectional signal voltage; a yaw rate gyroscope; signal means actuated by said gyroscope for providing a unidirectional signal voltage which varies in magnitude and polarity with the magnitude and sense of the rate of change of said direction; and a capacitor connecting said signal means to said controlling means, for transmitting to said controlling means only the variations in the signal voltage from said gyro-actuated means.

6. Apparatus of the class described comprising, in combination: a body subject to variation in the rate of change of the direction of an axis thereof; means normally altering the direction of said axis in accordance with a signal; gyroscopic means responsive to said rate of change for supplying a signal to said last named means which varies in accordance with said rate of change; means normally causing operation of said direction altering means in accordance with said signal; and means preventing said signal from causing said operating of said direction altering means as long as said rate of change has a constant value.

7. An automatic pilot comprising, in combination: means for positioning the elevators of a craft; means normally controlling said positioning means in accordance with the joint effect of a plurality of signals so as to maintain the craft at a constant altitude, said signals including an altitude displacement signal derived from a first signal device which is continuously spring-centered and which is normally driven in opposition to the effect of the centering springs by a first motor in accordance with change in the altitude of the craft, and an altitude reset signal derived from a second signal device which is driven by a second motor normally energized whenever said first signal device is not centered; first disabling means disconnecting said first signal device from said first motor, and energizing said second motor as long as any altitude reset signal exists, so that said altitude displacement signal is quickly reduced to zero and said altitude reset signal is slowly reduced to zero; second disabling means disconnecting said first signal device from said first motor, and interrupting energization of said second motor, so that said altitude displacement signal is quickly reduced to zero and said altitude reset signal remains unchanged, and third disabling means deenergizing both said motors without disconnecting said first signal device from said first motor, so that both said altitude displacement signal and said altitude reset signal remain unchanged.

8. An automatic pilot comprising, in combination: means for positioning the elevators of a craft; means normally controlling said positioning means in accordance with the joint effect of a plurality of signals so as to maintain the craft at a constant altitude, said signals including an altitude displacement signal derived from a first signal device which is continuously spring-centered and which is normally driven in opposition to the effect of the centering springs by a first motor in accordance with change in the altitude of the craft, and an altitude reset signal derived from a second signal device which is driven by a second motor normally energized whenever said first signal device is not centered; first disabling means disconnecting said first signal device from said first motor, and energizing said second motor as long as any altitude reset signal exists, so that said altitude displacement signal is quickly reduced to zero and said altitude reset signal is slowly reduced to zero; and second disabling means disconnecting said first signal device from said first motor, and interrupting energization of said second motor, so that said altitude displacement signal is quickly reduced to zero and said altitude reset signal remains unchanged.

9. An automatic pilot comprising, in combination: means for positioning the elevators of a craft; means normally controlling said positioning means in accordance with the joint effect of a plurality of signals so as to maintain the craft at a constant altitude, said signals including an altitude displacement signal derived from a first signal device which is continuously spring-centered and which is normally driven in opposition to the effect of the centering springs by a first motor in accordance with change in the altitude of the craft, and an altitude reset signal derived from a second signal device which is driven by a second motor normally energized whenever said first signal device is not centered; first disabling means disconnecting said first signal device from said first motor, and energizing said second motor as long as any altitude reset signal exists, so that said altitude displacement signal is quickly reduced to zero and said altitude reset signal is slowly reduced to zero; and second disabling means deenergizing both said motors without disconnecting said first signal device from said first motor, so that both said altitude displacement signal and said altitude reset signal remain unchanged.

10. Apparatus of the class described comprising, in combination: an automatic pilot for an aircraft including aileron and rudder control channels; a cageable precessible directional gyroscope connected to said channels for supplying thereto, when not caged, signals proportioned to give coordinated turn correction of heading error; energizable means connected to said channels for supplying thereto when energized a pair of signals proportioned to give coordinated turns of the aircraft in accordance with energization thereof; radio responsive means arranged to give a plurality of outputs corresponding to the displacement of the aircraft from a desired path; means manually adjustable to give a command output; switching means for supplying selectively either said command output or a first of said control outputs to energize said energizeable means; and means operable to simultaneously uncage said directional gyroscope, to substitute the second output for said first output, to supply said second output from said radio responsive means to said rudder control channel only, and to precess said directional gyroscope in accordance with a further output from said radio responsive means.

11. Apparatus of the class described comprising, in combination: control means for positioning the pitch attitude control member of an aircraft in accordance with the joint effect of a plurality of signals; manually operable means for supplying a first signal of variable magnitude and reversible sense; altitude responsive means giving a second signal which varies in magnitude and sense with change in the altitude of the aircraft; altitude reset means giving a third signal which changes at a selected rate as long as said first signal is not zero, the direction of change of said third signal being determined by the sense of said second signal; centering means for restoring said second and third signals respectively to zero values; disabling means energizeable to fix said third signal at any instantaneous value thereof; connecting means transmitting said signals to said control means; and means connected to said manually operable means for actuation, upon operation thereof, to make operative said disabling means and the first named centering means.

12. Apparatus of the class described comprising, in combination: control means for positioning the pitch attitude control member of an aircraft in accordance with the joint effect of a plurality of signals; a control stick for supplying a first signal of variable magnitude and reversible sense; altitude responsive means giving a second signal which varies in magnitude and sense with change in the altitude of the aircraft; altitude reset means giving a third signal which changes at a selected rate as long as said first signal is not zero, the direction of the change of said third signal being determined by the sense of said second signal; centering means for restoring said second and third signals respectively to zero values; disabling means energizeable to fix said third signal at any instantaneous value thereof; connecting means transmitting said signals to said control means; and means connected to said control stick for actuation upon operation thereof, to make operative said disabling means and the first named centering means.

13. In a control system for a craft having a movable control surface arranged to turn said craft about an axis thereof, means for generating a first signal proportional to the displacement of said suface from a normal position, means for generating a second signal proportional to the rate of turn of said craft about said axis, means responsive to the difference of said signals for moving said surface, and time element means connected to neutralize steady-state values of said second signal.

14. In a control system for a craft having a movable control surface arranged to turn said craft about one coordinate axis thereof, servo means including a signal responsive device for moving said control surface, a first signal source for generating a signal proportional to the rate-of-turn of said craft about said axis, a second signal source for generating a signal responsive to the displacement of said signal responsive device from a predetermined null position, means utilizing the signals from said first and second sources to energize said signal responsive device, and time element means connected to nullify non-transient values of the signals from said first signal source.

15. In an autopilot for a craft having a movable control surface arranged to turn said craft about an axis thereof, a signal channel for controlling the position of said surface including oscillation damping means comprising servo means for moving said control surface, follow-up means for generating a first signal proportional to the displacement of said servo means from a predetermined normal position, rate responsive means for generating a second signal proportional to the rate of movement of said craft about said axis, means energizing said servo means in accordance with the difference of said first and second signals, and canceller means for nullifying non-transient values of said second signal.

16. In a control system for a craft having a movable control surface arranged to turn said craft about one coordinate axis thereof, signal responsive actuating means connected to move said surface, means for generating a first signal proportional to rate of turn of said craft about said axis, means for generating a second signal proportional to displacement of said surface from a null position under the influence of said actuating means, and time element means connected to render substantially steady-state values of said first signal ineffective to control said actuating means.

17. In an aircraft having a moveable control surface for controlling the movement of the aircraft about an axis thereof and having manual means for moving said control surface including an actuating control stick and means interconnecting said stick and said surface, automatic means for damping oscillations of said aircraft about said axis comprising a servo in the interconnection between said stick and said surface, a first signal source for producing a signal proportional to the displacement of said servo from a predetermined normal position, a second signal source for producing a signal proportional to the rate of movement of said aircraft about said axis, and means responsive to the difference of said signals for energizing said servo, and time element means connected to nullify steady-state values of said second signal.

18. In an aircraft having a movable control surface for controlling the movement of the aircraft about an axis thereof and having autopilot means for moving said control surface including an actuating device and means interconnecting said device and said surface, automatic means for damping oscillations about said axis comprising a servo in the interconnection between said device and said surface, a first signal source for producing a signal proportional to the displacement of said servo from a predetermined normal position, a second signal source for producing a signal proportional to the rate of movement of said aircraft about said axis, and means responsive to the difference of said signals for energizing said servo, and time element means connected to nullify steady-state values of said second signal.

19. In a control system for a craft having a movable control surface arranged to turn the craft about one coordinate axis thereof, servo means including a signal responsive device for moving said control surface, a first signal source for generating a signal proportional to the rate of turn of said craft about said axis, a second signal source for generating a signal responsive to displacement of said signal responsive device from a predetermined null position, means utilizing said signals to energize said signal responsive device, and time element means connected to cancel substantially steady-state values of signals from said first signal source.

20. In a control apparatus for an aircraft having an elevator adapted to control the craft attitude relative to the pitch axis theerof, signal responsive actuating means connected to move said elevator, rate responsive means for generating a continuous signal proportional to the rate-of-change of craft attitude relative to said pitch axis, means for generating a continuous signal proportional to the altitude deviation of said craft from a predetermined altitude, means for producing a continuous signal proportional to the rate-of-change of altitude of said craft, means for generating a continuous signal in response to displacement of said elevator from a predetermined normal position, and means coupling said signals to energize said actuating means.

21. In a control apparatus for an aircraft having an elevator arranged to maneuver said aircraft about its pitch axis, a servomotor arranged to movably position said elevator, rate responsive means for producing a continuous signal proportional to the rate of movement of said aircraft about said pitch axis, means for generating a continuous signal proportional to the altitude deviation of said aircraft from a predetermined a titude, means for producing a continuous signal proportional to the rate-of-change of altitude of said aircraft, follow-up means for producing a continuous signal proportional to the displacement of said elevator from a predetermined normal position, and means coupling said signals to actuate said servomotor.

22. In a control apparatus for an aircraft having an elevator for maneuvering said aircraft about its pitch axis, elevator control apparatus comprising servo means arranged to movably position said elevator, attitude stabilizing means for producing a signal proportional to the rate of movement of said aircraft about said pitch axis, altitude maintaining means including means for producing a signal proporticnal to the altitude deviation of said aircraft from a predetermined altitude and means for producing a signal proportional to the rate-of-change of altitude of said aircraft, follow-up means for producing a signal in response to the displacement of said elevator from a predetermined normal position, manually controlled maneuvering means for producing a signal, means coupling said signals to actuate said servo means, and means interlocked with said maneuvering means for disabling said altitude maintaining means in response to signal generating actuation of said maneuvering means.

23. In a high performance servo control system for positioning the elevator of an aircraft to both maintain the aircraft at a desired altitude and provide pitch stabilization at said altitude, reversibly operating means for positioning said elevator, altitude sensing means for energizing said positioning means with a continuous signal proportional to aircraft deviation from a desired altitude, altitude rate sensing means energizing said positioning means with a continuous signal proportional to the rate of change of aircraft altitude, attitude rate sensing means responsive to aircraft instability for energizing said positioning means with a continuous signal proportional to the rate of change of aircraft attitude relative to the pitch axis, follow-up means for additionally energizing said poistioning means with a continuous signal proportional to elevator movement, and means coupling said signals to actuate said reversibily operating means, whereby said altitude sensing means and altitude rate sensing means jointly enable the servo system to maintain the craft at a fixed altitude, and said attitude sensing means and altitude rate sensing means jointly enable the maintenance of pitch stabilization at said fixed altitude.

24. In a control apparatus for an aircraft having an elevator adapted to control the craft attitude relative to the pitch axis thereof, signal responsive actuating means connected to move said elevator, a rate gyro for generating a continuous signal proportional to the rate-of-change of craft attitude relative to said pitch axis, means for generating a continuous signal proportional to the altitude deviation of said craft from a predetermined altitude, means for producing a continuous signal proportional to the rate-of-change of altitude of said craft, means for generating a continuous signal in response to displacement of said elevator from a predetermined normal position, and means coupling said signals to energize said actuating means.

25. In a control apparatus for an aircraft having an elevator for maneuvering said aircraft about its pitch axis, elevator control apparatus comprising servo means arranged to movably position said elevator, a rate gyro for producing a signal proportional to the rate of movement of said aircraft about said pitch axis, altitude maintaining means including means for producing a signal proportional to the altitude deviation of said aircraft from a predetermined altitude and means for producing a signal proportional to the rate-of-change of altitude of said aircraft, follow-up means for producing a signal in response to the displacement of said elevator from a predetermined normal position, manually controlled maneuvering means for producing a signal, means coupling said signals to actuate said servo means, and means interlocked with said maneuvering means for disabling said altitude maintaining means in response to signal generating actuation of said maneuvering means.

26. In a control system for a craft having a movable control surface arranged to turn said craft about an axis thereof, means for generating a first signal proportional to the displacement of said surface from a normal position, means for generating a second signal proportional to the rate of turn of said craft about said axis, and means responsive to the difference of said signals for moving said surface, including time element means connected to neutralize steady-state values of said second signal.

27. In a control system for a craft having a movable control surface arranged to turn said craft about a first axis thereof, manually operable means for moving said surface, electrically actuated means for moving said surface, means for generating a first signal proportional to the displacement of said surface from a normal position, means for generating a second signal proportional to the rate of turn of said craft about said first axis, means for generating a third signal proportional to the deviation of said craft from a desired angle relative to a second axis thereof, means coupling said signals to actuate said electrically actuated means, and time element means connected to neutralize steady-state values of said first and second signals.

28. In an autopilot for a craft having a movable control surface arranged to turn said craft about a first axis thereof, servo means for moving said control surface, follow-up means for producing a first signal proportional to the displacement of said servo means from a normal position, rate-responsive means for generating a second signal proportional to the rate-of-movement of said craft about said first axis, means for generating a signal proportional to the deviation of said craft from a desired angle relative to a second axis thereof, means coupling said signals to actuate said servo means, and canceller means connected to nullify non-transient values of said first and second signals.

29. In an autopilot for an aircraft having a rudder arranged to turn said aircraft about the vertical axis thereof, a signal channel including servo means for moving said rudder, a first signal source in said channel for generating a signal proportional to the displacement of said rudder from a normal position, a second signal source in said channel for generating a signal proportional to the rate of turn of said aircraft about said axis, a third signal source in said channel for generating a signal proportional to the departure of the apparent vertical of said aircraft from the true vertical thereof, means connecting said sources to actuate said servo means, and time element means connected to neutralize steady-state signals from said first and second sources.

30. The apparatus of claim 5; and means responsive to the rate of roll of the craft and connected to said controlling means and supplying thereto a signal voltage which varies in polarity and magnitude with the direction and rate of roll of the craft.

31. The apparatus of claim 6; and means responsive to the angular rate of the craft about an axis perpendicular to said first recited axis, and connected to said first named means and supplying thereto a signal varying in magnitude and polarity in accordance with the angular rate and direction of the craft about the second axis.

References Cited in the file of this patent

UNITED STATES PATENTS

| | | |
|---|---|---|
| 1,896,805 | Sperry et al. | Feb. 7, 1933 |
| 1,988,458 | Minorsky | Jan. 22, 1935 |
| 2,190,390 | Thiry | Feb. 13, 1940 |
| 2,322,225 | Crane et al. | June 22, 1943 |
| 2,387,795 | Isserstedt | Oct. 30, 1945 |
| 2,398,421 | Frische et al. | Apr. 16, 1946 |
| 2,401,168 | Kronenberger | May 28, 1946 |
| 2,429,642 | Newton | Oct. 28, 1947 |
| 2,464,629 | Young | Mar. 15, 1949 |
| 2,466,702 | Hamby | Apr. 12, 1949 |
| 2,471,821 | Kutzler et al. | May 31, 1949 |
| 2,474,618 | Divoll | June 28, 1949 |
| 2,482,809 | Thompson | Sept. 27, 1949 |
| 2,496,294 | Kellogg | Feb. 7, 1950 |
| 2,503,346 | Meredith | Apr. 11, 1950 |
| 2,515,349 | Kutzler | July 18, 1950 |
| 2,521,304 | North | Sept. 5, 1950 |
| 2,532,936 | Peterson | Dec. 5, 1950 |
| 2,548,278 | Wirkler | Apr. 10, 1951 |
| 2,553,560 | Esval | May 22, 1951 |
| 2,553,983 | Saxman | May 22, 1951 |
| 2,582,305 | Young | Jan. 15, 1952 |
| 2,586,034 | Halpert | Feb. 19, 1952 |
| 2,589,834 | MacCallum | Mar. 18, 1952 |
| 2,619,623 | Meredith | Nov. 25, 1952 |
| 2,621,003 | Meredith | Dec. 9, 1952 |
| 2,632,135 | Carpenter | Mar. 17, 1953 |
| 2,634,391 | Rusler | Apr. 7, 1953 |
| 2,634,925 | Kutzler | Apr. 14, 1953 |
| 2,656,134 | Hanna et al. | Oct. 20, 1953 |
| 2,676,770 | Schuck | Apr. 27, 1954 |